(12) United States Patent
Palmaro

(10) Patent No.: US 12,333,670 B2
(45) Date of Patent: *Jun. 17, 2025

(54) METHOD AND SYSTEM FOR MERGING DISTANT SPACES

(71) Applicant: Unity IPR ApS, Copenhagen (DK)

(72) Inventor: Gregory Lionel Xavier Jean Palmaro, San Francisco, CA (US)

(73) Assignee: Unity IPR ApS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,152

(22) Filed: Apr. 24, 2024

(65) Prior Publication Data

US 2024/0412474 A1    Dec. 12, 2024

Related U.S. Application Data

(63) Continuation of application No. 18/144,084, filed on May 5, 2023, now Pat. No. 11,995,788, which is a continuation of application No. 17/453,583, filed on Nov. 4, 2021, now Pat. No. 11,676,355.

(60) Provisional application No. 63/109,637, filed on Nov. 4, 2020.

(51) Int. Cl.
*G06T 19/20*    (2011.01)
*G06T 19/00*    (2011.01)

(52) U.S. Cl.
CPC ............ *G06T 19/20* (2013.01); *G06T 19/003* (2013.01); *G06T 19/006* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 11,676,355 B2 | 6/2023 | Palmaro | |
| 2017/0169610 A1* | 6/2017 | King | G02B 27/017 |
| 2018/0322706 A1 | 11/2018 | Drouin et al. | |
| 2019/0197788 A1 | 6/2019 | Forbes et al. | |
| 2020/0126310 A1 | 4/2020 | Maneri | |
| 2020/0151965 A1 | 5/2020 | Forbes et al. | |
| 2022/0139055 A1 | 5/2022 | Palmaro | |

(Continued)

FOREIGN PATENT DOCUMENTS

CA    3137510    4/2024

OTHER PUBLICATIONS

"European Application Serial No. 21206493.5, Extended European Search Report mailed Feb. 22, 2022", 7 pgs.

(Continued)

*Primary Examiner* — Robert J Craddock
(74) *Attorney, Agent, or Firm* — Schwegman Lundberg & Woessner, P.A.

(57) ABSTRACT

A method of merging distant virtual spaces is disclosed. Data describing an environment surrounding a MR merging device is received. A first slice plane is generated, positioned, and displayed within the environment. A second MR merging device is connective with in a second environment. Data describing inbound content from the second MR merging device is received. Content data is sent from the MR merging device to the second MR merging device. The inbound content data is processed and displayed on the first slice plane.

18 Claims, 22 Drawing Sheets

(56) References Cited

U.S. PATENT DOCUMENTS

2024/0078772 A1   3/2024   Palmaro

OTHER PUBLICATIONS

"U.S. Appl. No. 17/453,583, Non Final Office Action mailed Jul. 19, 2022", 8 pgs.

"European Application Serial No. 21206493.5, Responsee filed Oct. 28, 2022 to Extended European Search Report mailed Feb. 22, 2022", 31 pgs.

"U.S. Appl. No. 17/453,583, Examiner Interview Summary mailed Nov. 16, 2022", 2 pgs.

"U.S. Appl. No. 17/453,583, Response filed Dec. 19, 2022 to Non Final Office Action mailed Jul. 19, 2022", 9 pgs.

"Canadian Application Serial No. 3137510 Examiners Rule 86 2 Requisition mailed Dec. 16, 2022", 4 pages.

"U.S. Appl. No. 17/453,583, Notice of Allowance mailed Feb. 3, 2023", 9 pgs.

"U.S. Appl. No. 17/453,583, Corrected Notice of Allowability mailed Feb. 21, 2023", 7 pgs.

"Canadian Application Serial No. 3137510 Response Filed Apr. 17, 2023 to Examiners Rule 86 2 Requisition mailed Dec. 16, 2022", 9 pgs.

"U.S. Appl. No. 18/144,084, Preliminary Amendment filed Nov. 24, 2023", 8 pgs.

"U.S. Appl. No. 18/144,084, Notice of Allowance mailed Jan. 24, 2024", 9 pgs.

* cited by examiner

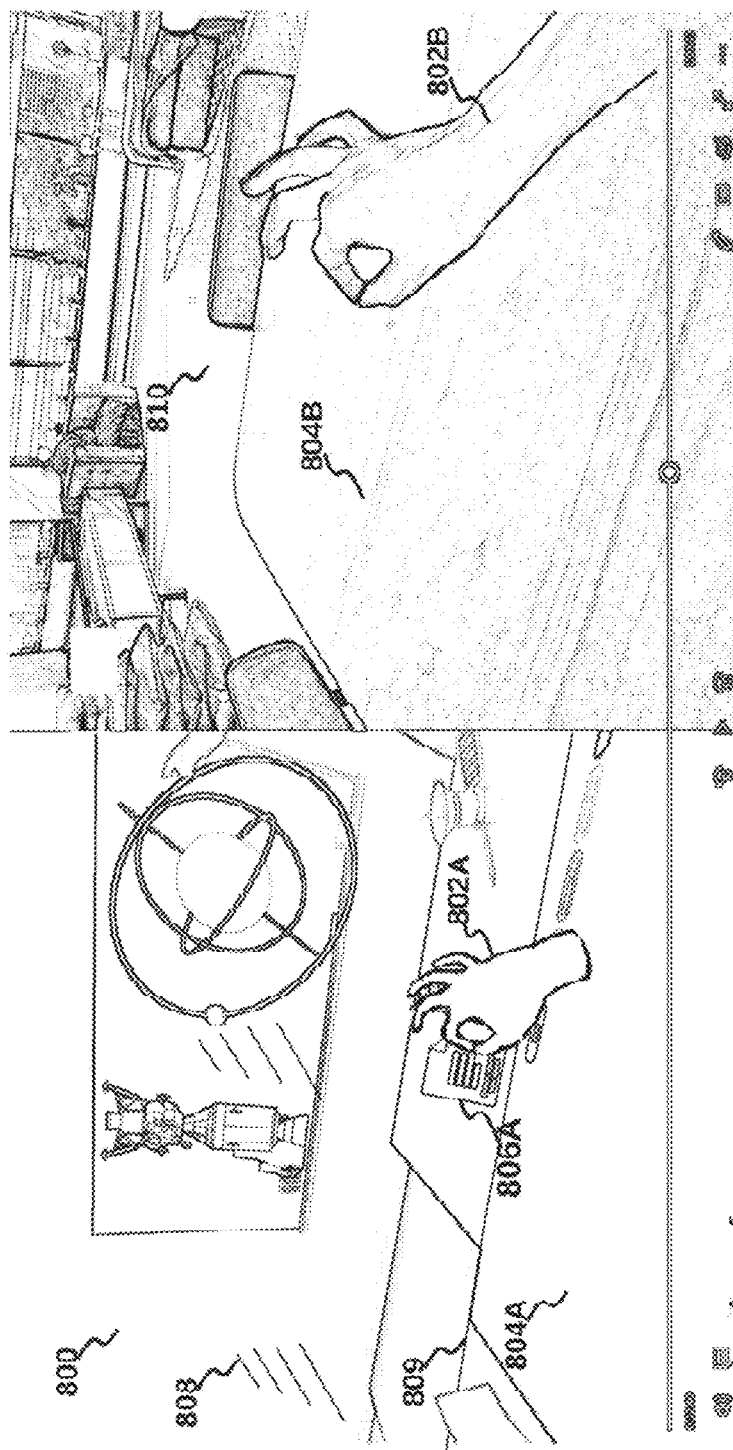

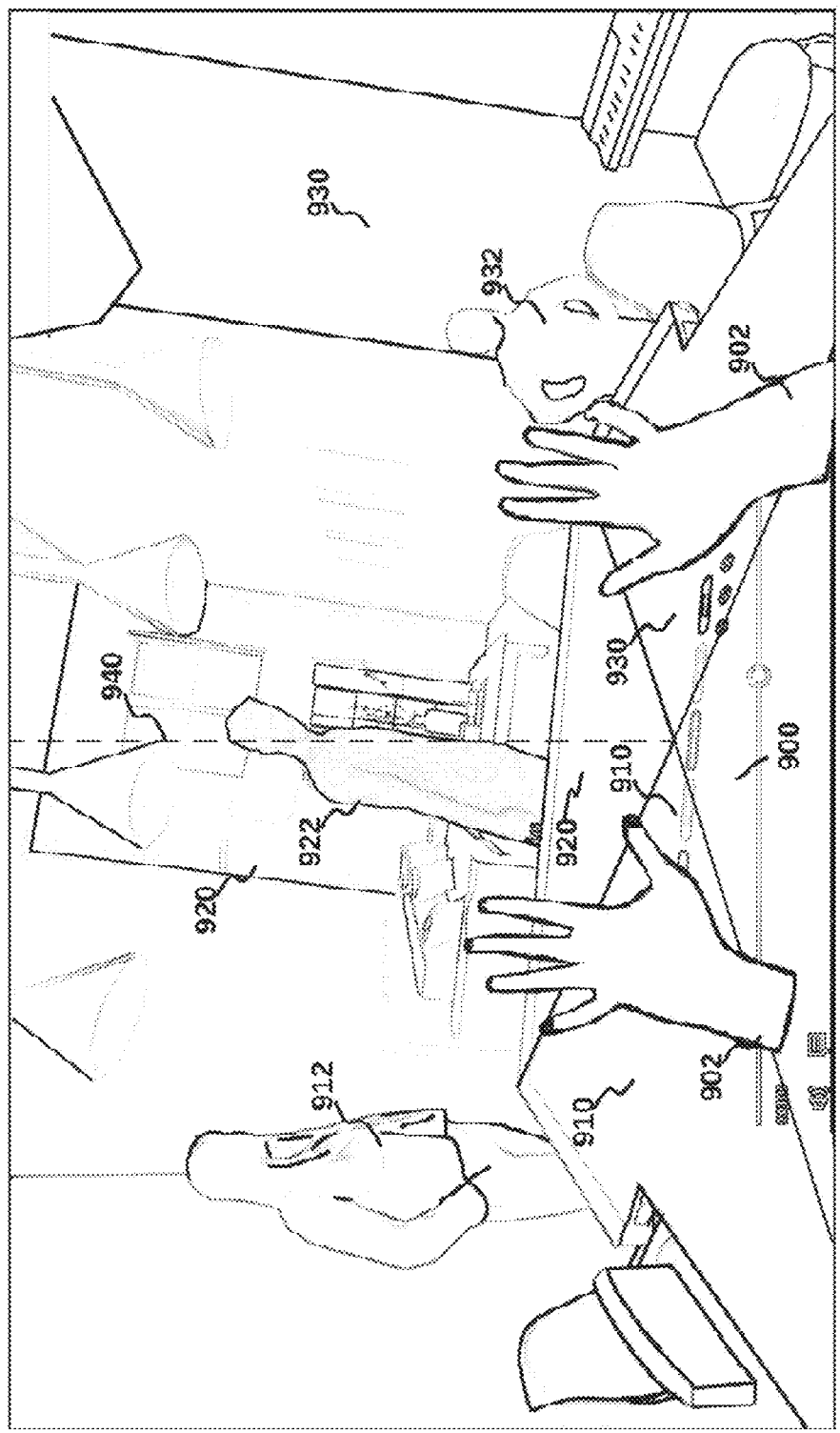

METHOD AND SYSTEM FOR MERGING DISTANT SPACES

CROSS-REFERENCE TO RELATED APPLICATIONS

This application is a continuation of and claims the benefit of priority under 35 U.S.C. § 120 to U.S. patent application Ser. No. 18/144,084, filed on May 5, 2023, which is a continuation of and claims the benefit of priority under 35 U.S.C. § 120 to U.S. Patent Application Ser. No. 17/453,583, filed on Nov. 4, 2021, which claims the benefit of U.S. Provisional Application No. 63/109,637, filed Nov. 4, 2020, entitled "METHOD AND SYSTEM FOR MERGING DISTANT SPACES," each of which is incorporated by reference herein in its entirety.

TECHNICAL FIELD

The subject matter disclosed herein generally relates to the technical field of computer systems, and in one specific example, to computer systems and methods for sharing virtual spaces.

BRIEF DESCRIPTION OF THE DRAWINGS

Features and advantages of example embodiments of the present disclosure will become apparent from the following detailed description, taken in combination with the appended drawings, in which:

FIG. 8A is an illustration of document sharing within a MR merging system, in accordance with an embodiment;

FIG. 9 is an illustration of a combination of a plurality of slice planes, in accordance with an embodiment;

It will be noted that throughout the appended drawings, like features are identified by like reference numerals.

DETAILED DESCRIPTION

Figure 1A:
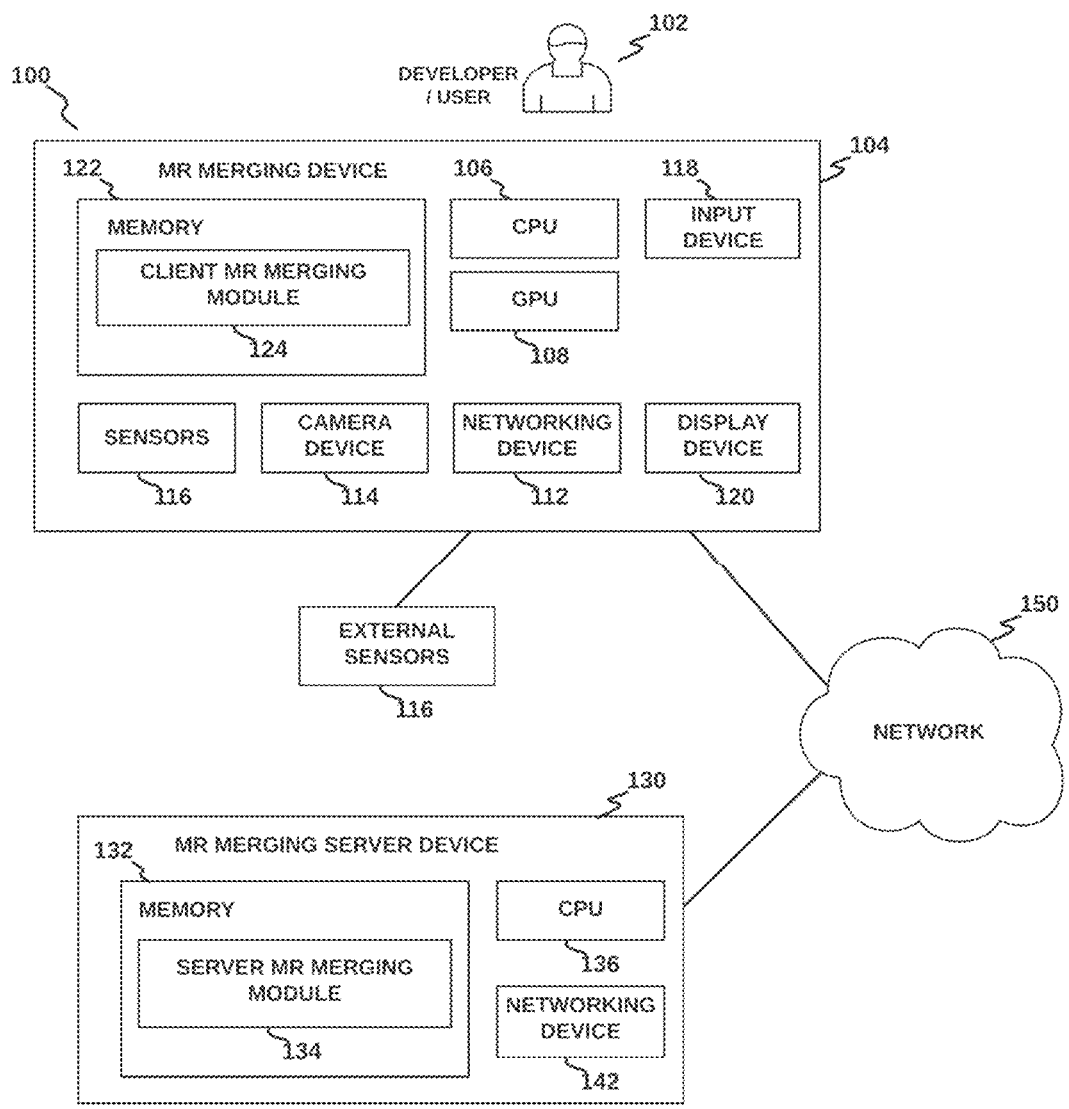
FIG. 1A is a schematic illustrating a MR merging system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure, or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

The term 'build' and 'game build' used throughout the description herein should be understood to include a compiled binary code of a game which can be executed on a device, and which, when executed can provide a playable version of the game (e.g., playable by a human or by an artificial intelligence agent).

The terms 'client' and 'application client' used throughout the description herein are understood to include a software client or software application that can access data and services on a server, including accessing over a network.

Throughout the description herein, the term 'mixed reality' (MR) should be understood to include all combined environments in the spectrum between reality and virtual reality (VR) including virtual reality, augmented reality (AR) and augmented virtuality.

A method of merging distant virtual spaces is disclosed. Data describing an environment surrounding a MR merging device is received. A first slice plane is generated, positioned, and displayed within the environment. A second MR merging device is connective with in a second environment. Data describing inbound content from the second MR merging device is received. Content data is sent from the MR merging device to the second MR merging device. The inbound content data is processed and displayed on the first slice plane.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

Turning now to the drawings, systems and methods, including non-routine or unconventional components or operations, or such combinations of components or operations, for mixed reality (MR) merging of distant spaces in accordance with embodiments of the invention are illustrated. In example embodiments, FIG. 1A is a diagram of an example MR merging system 100 and associated devices configured to provide MR merging system functionality to a user 102. In the example embodiment, the MR merging system 100 includes a MR merging device 104, operated by the user 102 and a MR merging server device 130 coupled in networked communication with the MR merging device 104 via a network 150 (e.g., a cellular network, a Wi-Fi network, the Internet, and so forth). The MR merging device 104 is a computing device capable of providing a mixed reality experience to the user 102.

In the example embodiment, the MR merging device 104 includes one or more central processing units (CPUs) 106 and graphics processing units (GPUS) 108. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks as described herein in reference to FIG. 2, FIG. 3A, FIG. 3B, FIG. 3C, FIG. 4A, FIG. 4B, FIG. 4C, FIG. 5A, FIG. 5B, FIG. 5C, FIG. 5D, FIG. 5E, FIG. 6, FIG. 7, FIG. 8A, FIG. 8B, FIG. 8C, and FIG. 9. The MR merging device 104 also includes one or more networking devices 112 (e.g., wired or wireless network adapters) for communicating across the network 150. The MR merging device 104 further includes one or more camera devices 114 which may be configured to capture digital video of the real world near the MR merging device 104 during operation. The MR merging device 104 may also include one or more sensors 116, such as a global positioning system (GPS) receiver (e.g., for determining a GPS location of the MR merging device 104), biometric sensors (e.g., for capturing biometric data of the user 102), motion or position sensors (e.g., for capturing position data of the user 102 or other objects), and an audio microphone (e.g., for capturing sound data). Some sensors 116 may be external to the MR merging device 104, and may be configured to wirelessly communicate with the MR merging device 104 (e.g., such as used in the Microsoft Kinect®, Vive Tracker™, MIT'S Lidar sensor, or MIT's wireless emotion detector).

The MR merging device 104 also includes one or more input devices 118 such as, for example, a keyboard or keypad, a mouse, a pointing device, a touchscreen, a handheld device (e.g., hand motion tracking device), a microphone, a camera, and the like, for inputting information in the form of a data signal readable by the processing device 106. The MR merging device 104 further includes one or more display devices 120, such as a touchscreen of a tablet or smartphone, or lenses or visor of a VR or AR HMD, which may be configured to display virtual objects to the user 102 in conjunction with a real world view.

The MR merging device 104 also includes a memory 122 configured to store a client MR merging module ("client module") 124. The memory 122 can be any type of memory device, such as random access memory, read only or rewritable memory, internal processor caches, and the like.

In the example embodiment, the camera device 114 and sensors 116 capture data from the surrounding environment, such as video, audio, depth information, GPS location, and so forth. The client module 124 may be configured to analyze the sensor data directly, or analyze processed sensor data (e.g., a real-time list of detected and identified objects, object shape data, depth maps, and the like).

In accordance with an embodiment, the memory may also store a game engine (e.g., not shown in FIG. 1A) (e.g., executed by the CPU 106 or GPU 108) that communicates with the display device 120 and also with other hardware such as the input/output device(s) 118 to present a 3D environment (e.g., a virtual reality environment, a mixed reality environment, and the like) to the user 102. The game engine would typically include one or more modules that provide the following: simulation of a virtual environment and digital objects therein (e.g., including animation of digital objects, animation physics for digital objects, collision detection for digital objects, and the like), rendering of the virtual environment and the digital objects therein, networking, sound, and the like in order to provide the user with a complete or partial virtual environment (e.g., including video game environment or simulation environment) via the display device 120. In accordance with an embodiment, the simulation and rendering of the virtual environment may be de-coupled, each being performed independently and concurrently, such that the rendering uses a recent state of the virtual environment and current settings of the virtual environment to generate a visual representation at an interactive frame rate and, independently thereof, the simulation step updates the state of at least some of the digital objects (e.g., at another rate).

In accordance with an embodiment, the MR merging server device 130 includes one or more central processing units (CPUs) 136. The processing device 136 is any type of processor, processor assembly comprising multiple processing elements (not shown), having access to a memory 132 to retrieve instructions stored thereon, and execute such instructions. Upon execution of such instructions, the instructions implement the processing device 136 to perform a series of tasks as described herein in reference to FIG. 2, FIG. 3A, FIG. 3B, FIG. 3C, FIG. 4A, FIG. 4B, FIG. 4C, FIG. 5A, FIG. 5B, FIG. 5C, FIG. 5D, FIG. 5E, FIG. 6, FIG. 7, FIG. 8A, FIG. 8B, FIG. 8C, and FIG. 9. The MR merging server device 130 also includes one or more networking devices 142 (e.g., wired or wireless network adapters) for communicating across the network 150. In accordance with an embodiment, the MR merging server device includes a memory 132 storing a server MR merging module ("server module") 134. During operation, the client MR merging module 124 and the server MR merging module 134 perform the various MR merging system functionalities described herein. More specifically, in some embodiments, some functionality may be implemented within the client module 124 and other functionality may be implemented within the server module 134 as described in FIG. 2.

Figure 1B:
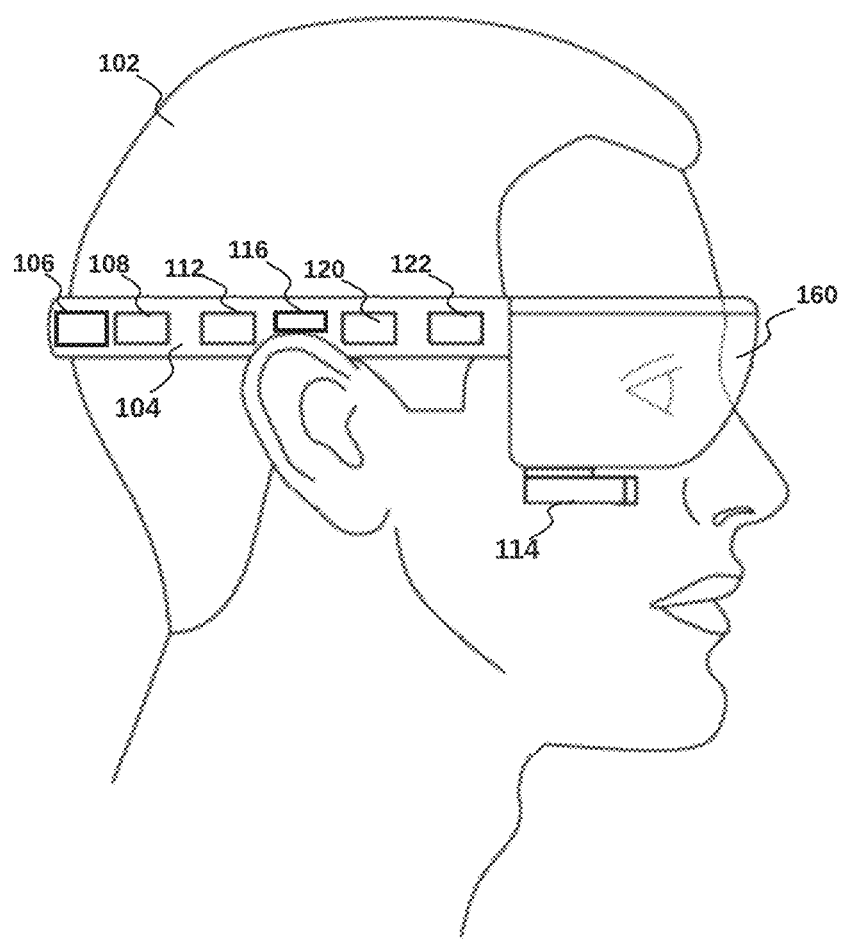
FIG. 1B is a schematic illustrating a head mounted MR merging device, in accordance with one embodiment.

In accordance with some embodiments, the MR merging device 104 is a mobile computing device, such as a smartphone or a tablet computer. In accordance with another embodiment, and as shown in FIG. 1B, the MR merging device 104 is a head-mounted display (HMD) device worn by the user 102, such as an augmented reality (AR) or virtual reality (VR) visor (e.g., Google Glass®, HTC Vive®, Microsoft HoloLens®, the PlayStation VR™, Oculus Rift™, and so forth). In the example embodiment, the user 102 (e.g., a human) experiences a VR environment or AR environment while wearing the HMD MR merging device 104. During operation, in the example embodiment, the HMD MR merging device 104 is mounted on a head of the wearer 102, and over both eyes of the wearer 102, as shown in FIG. 1B. The wearer 102 may be presented with a virtual environment which may be viewed and interacted with via the HMD 104 and handhelds as described herein (handhelds described below). The HMD MR merging device 104 includes a transparent or semi-transparent visor (or "lens" or "lenses") 160 through which the wearer 102 views their surroundings (also herein referred to as "the real world"). In other embodiments, the HMD MR merging device 104 may include an opaque visor 160 which may obscure the wearer 102's view of the real world and on which a complete virtual environment is displayed (e.g., including displaying video from the camera device 114).

In accordance with an embodiment, the HMD MR merging device 104 shown in FIG. 1B includes components similar to the MR merging device 104 discussed in relation to FIG. 1A. For example, the HMD MR merging device 104 shown in FIG. 1B includes a display device 120, a networking device 112, a camera device 114, a CPU 106, a GPU 108, a memory 122, sensors 116, and one or more input devices 118 (not explicitly shown in FIG. 1B). In the example embodiment, the display device 120 may render graphics (e.g., virtual objects) onto the visor 160. As such, the visor 160 acts as a "screen" or surface on which the output of the display device 120 appears, and through which the wearer 102 experiences virtual content. The display device 120 may be driven or controlled by one or more graphical processing units (GPUs) 108. In accordance with some embodiments, the display device 120 may include the visor 160.

In accordance with some embodiments, the digital camera device (or just "camera") 114 on the MR merging device 104 is a forward-facing video input device that is oriented so as to capture at least a portion of a field of view (FOV) of the wearer 102. In other words, the camera 114 captures or "sees" an angle of view of the real world based on the orientation of the HMD device 104 (e.g., similar to what the wearer 102 sees in the wearer 102's FOV when looking through the visor 160). The camera device 114 may be configured to capture real-world digital video around the wearer 102 (e.g., a field of view, a peripheral view, or a 360° view around the wearer 102). In some embodiments, output from the digital camera device 114 may be projected onto the visor 160 (e.g., in opaque visor embodiments), and may also include additional virtual content (e.g., added to the camera output). In some embodiments, the camera device 114 may be a depth camera capable of recording depth information within the surrounding environment. In other embodiments, there may be a depth camera in addition to a non-depth camera on the HMD 104.

In accordance with some embodiments, the HMD MR merging device 104 may include one or more sensors 116, or may be coupled in wired or wireless communication with the sensors 116. For example, the HMD MR merging device 104 may include motion or position sensors configured to determine a position or orientation of the HMD 104. In some embodiments, the HMD MR merging device 104 may include a microphone (not shown) for capturing audio input (e.g., spoken vocals of the user 102).

In accordance with some embodiments, the user 102 may hold one or more input devices 118 including hand tracking devices ("handhelds") (not separately shown in FIG. 1B) (e.g., one in each hand). The handhelds may provide information about an absolute or relative position and orientation of a user's hands and, as such, are capable of capturing hand gesture information. The handhelds may be configured to operate directly with the HMD MR merging device 104 (e.g., via wired or wireless communication). In some embodiments, the handhelds may be Oculus Touch™ hand controllers, HTC Vive™ hand trackers, PlayStation VR™ hand controllers, or the like. The handhelds may also include one or more buttons or joysticks built into the handhelds. In other embodiments, the user 102 may wear one or more wearable hand tracking devices (e.g., motion tracking gloves, not shown), such as those made commercially available by Manus VR™ (Netherlands). In still other embodiments, hand motion of the user 102 may be tracked without, or in addition to, the handhelds or wearable hand tracking devices via a hand position sensor (not shown, e.g., using optical methods to track the position and orientation of the user's hands) such as, for example, those made commercially available by Leap Motion™, Inc. (a California corporation). Such hand tracking devices (e.g., handhelds) track the position of one or more of the hands of the user during operation.

In some embodiments, the MR merging system 100 and the various associated hardware and software components described herein may provide AR content instead of, or in addition to, VR content (e.g., in a mixed reality (MR) environment). It should be understood that the systems and methods described herein (e.g., specifically with respect to FIG. 2 through FIG. 9) may be performed with AR content and, as such, the scope of this disclosure covers both AR and VR applications.

Figure 1C:
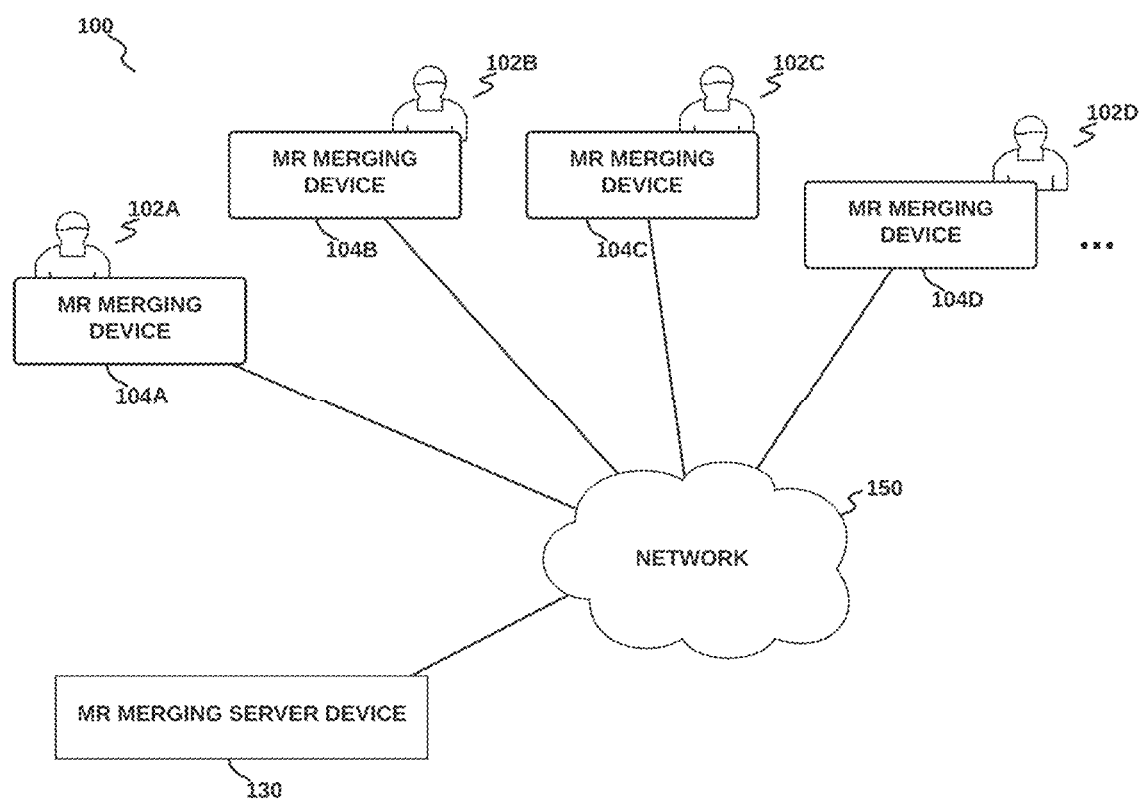
FIG. 1C is a schematic illustrating a MR merging system with a plurality of MR merging devices, in accordance with one embodiment.

In accordance with an embodiment, and as shown in FIG. 1C, a plurality of MR merging devices (104A, 104B, 104C and 104D) may be coupled in networked communication with the MR merging server device 130 via the network 150. The configuration shown in FIG. 1C may be used to connect a plurality of MR merging devices 104 as described in operations with the method 200 shown FIG. 2, and additionally in examples shown in FIG. 4A, FIG. 4B, FIG. 4C, FIG. 5D, FIG. 5E, FIG. 6, FIG. 8A, FIG. 8B, FIG. 8C, and FIG. 9.

Figure 2:
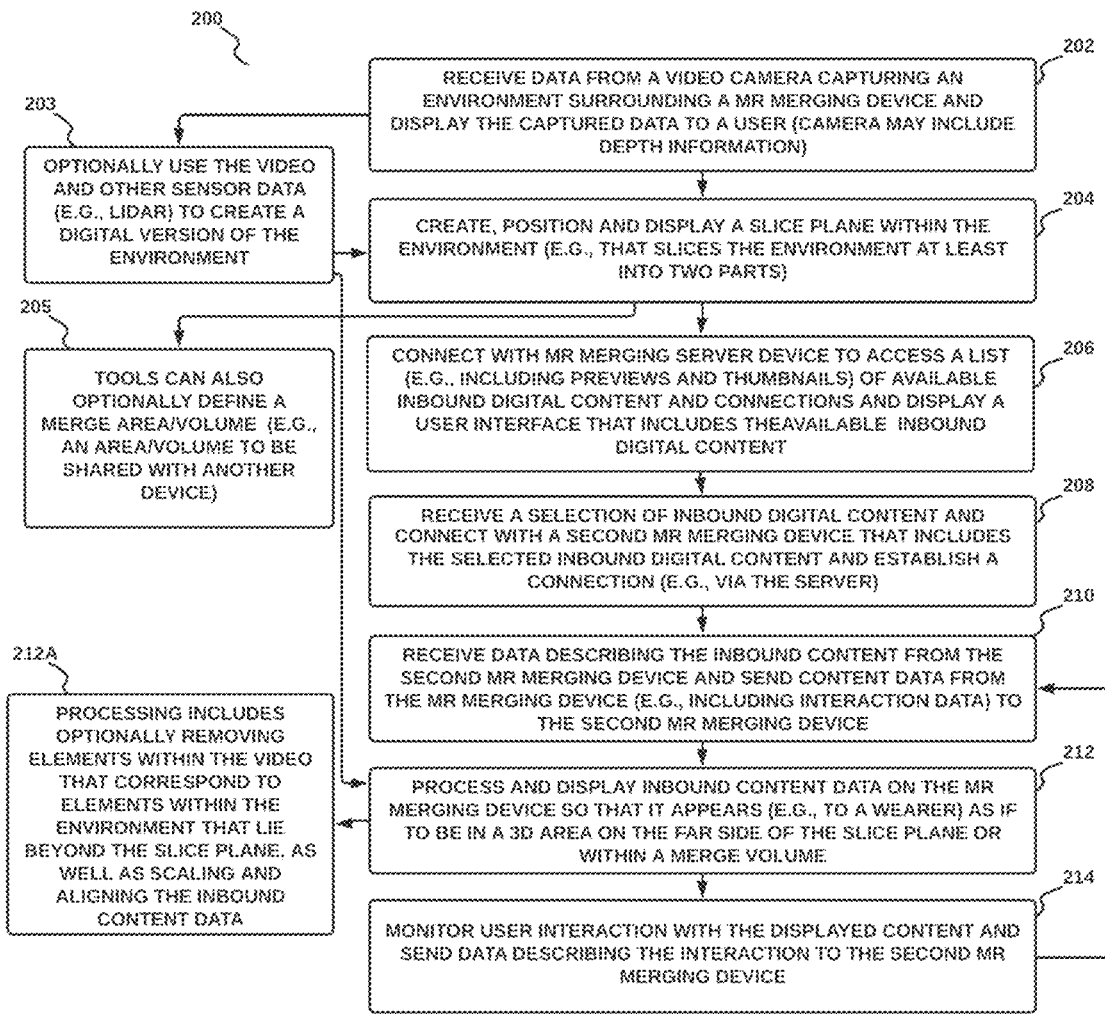
FIG. 2 is a schematic illustration of a flowchart of a method for a mixed reality merging of distant real-world spaces using a MR merging system, in accordance with an embodiment.

In accordance with an embodiment, and shown in FIG. 2 is a flowchart of a method 200 for MR merging of distant spaces. The method 200 may be used in conjunction with the MR merging system 100 as described with respect to FIG. 1A and FIG. 1B. In operation, the method 200 may be used in a mixed reality space (e.g., with AR and/or VR devices) in order to connect two or more real world environments together. The connection of the two or more real world environments provided by the method 200 could be either a one way connection (e.g., connecting a living room to a concert hall where information flows from the concert hall to the living room), or a two way connection (e.g., connecting two or more living rooms together whereby data describing environment views for both living rooms are sent in both directions). The method 200 provides a method for people to connect two or more real-world spaces without the limitation of being within a camera frustum or a VR sensor bubble, and provides a more natural interaction than just projecting a TV screen on a wall.

In accordance with an embodiment, at operation 202 of the method 200, the client MR merging module 124 receives data from a video camera capturing an environment surrounding a MR merging device 104 and displays the captured data on a display device 120 (e.g., for a user 102). For example, the MR merging device 104 may operate in a 'pass-through' mode whereby the captured video is captured and displayed in such a way that the surroundings appear in the display as if the MR merging device 104 was not there. For example, based on the MR merging device 104 being an HMD (e.g., as depicted in FIG. 1B) with an opaque visor 160, the 'pass-through' mode would allow a wearer of the HMD to see the surroundings as if they were not wearing the HMD. In accordance with an embodiment, operation 202 may be performed with an HMD MR merging device 104 with a see-through visor wherein the environment is seen through the visor.

In accordance with an embodiment, as part of operation 202, the client MR merging module 124 may also receive depth data from the camera device 114 or other sensors 116 (e.g., a LIDAR device) and generate volumetric data describing the environment.

In accordance with an embodiment, at operation 203, the client MR merging module 124 may create a digital version of the environment using the captured data from operation 202. Operation 203 may include object segmentation and object detection and may create a full or partial digital version of the environment (e.g., 3D volumetric data describing the environment). In accordance with an embodiment, operation 203 may be performed using the video data (e.g., including camera depth information), and optionally with data from the sensors 116 such as LIDAR. In accordance with an embodiment, the creation of the digital version of the environment may be performed outside of the MR merging module 124 or device 104 (e.g., with a secondary device such as a LIDAR device) wherein data describing the environment is received by the client MR merging module 124 during operation 202 or 203. The digital version of the environment created during operation 203 may be used to facilitate operations within the method 200, and specifically operation 204, operation 212, operation 213, and operation 214.

In accordance with an embodiment, at operation 204 of the method 200, the client MR merging module 124 creates, positions and displays a virtual plane in conjunction with the displayed environment (e.g., displayed as an overlay on a virtual environment such as in VR mode or pass-through mode, or displayed as an overlay on a real environment view such as in AR mode). The virtual plane is referred to herein as a slice plane, and is used by the client MR merging module 124 to segment the displayed environment in order to add digital content to the displayed environment (e.g., as described below in operation 212). In accordance with an embodiment, as part of operation 204, the client MR merging module 124 may create, position and display a merge area within the environment (e.g., a displayed outline of an area on a floor within the environment) in addition to, and which is associated with the slice plane. The merge area may be in contact with the slice plane (e.g., as shown below in FIG. 5A and FIG. 5B). While referred to herein as a merge area, the displayed merge area includes a display volume within the environment (e.g., a volume in a real-world room) which may be used as a shared space with a second merge area/volume determined by a second MR merging device in a second environment (e.g., a second real-world environment). In accordance with an embodiment, the merge area may be an area on a floor (or ground) in the environment, and the merge volume may be a volume above the merge area. In accordance with an embodiment, the merge volume may be determined manually (e.g., using handheld devices) and/or automatically (e.g., via an AI agent, or via rules, or the like).

Figure 3A:
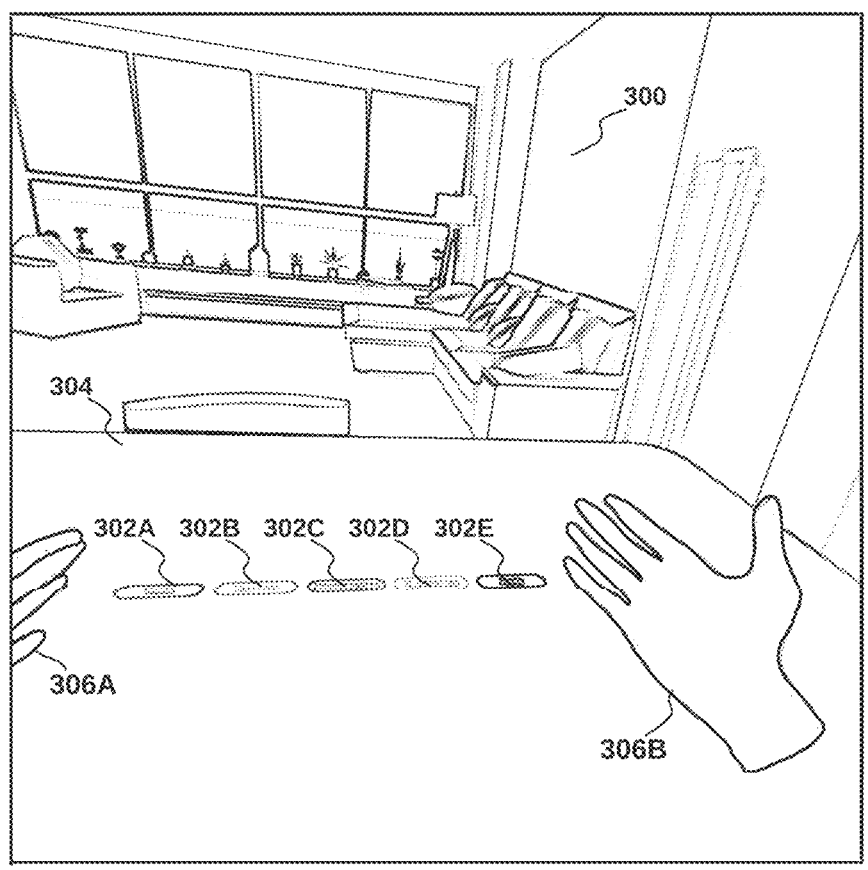
FIG. 3A is an illustration of a view of a mixed reality display of a content user interface within a MR merging system, in accordance with an embodiment.
Figure 3C:
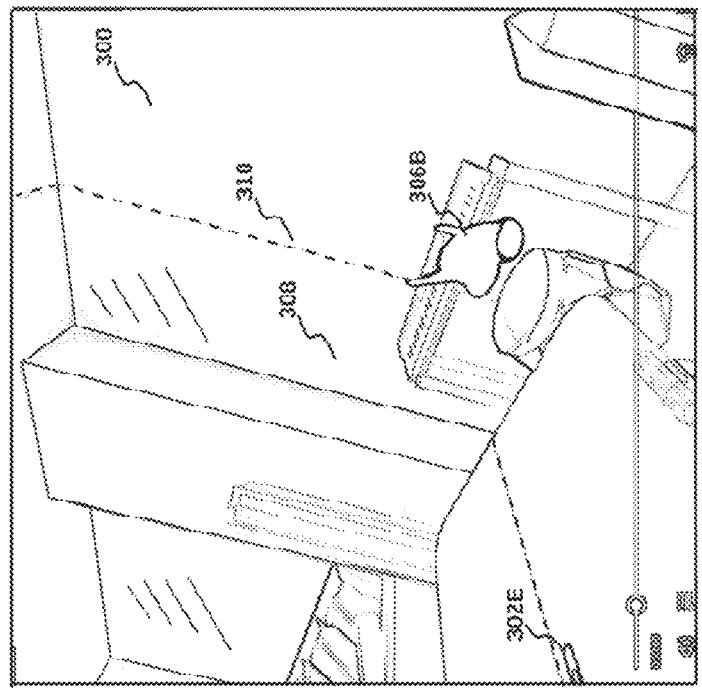
FIG. 3C is an illustration of a view of a mixed reality display of a slice plane within a MR merging system, in accordance with an embodiment.
Figure 3B:
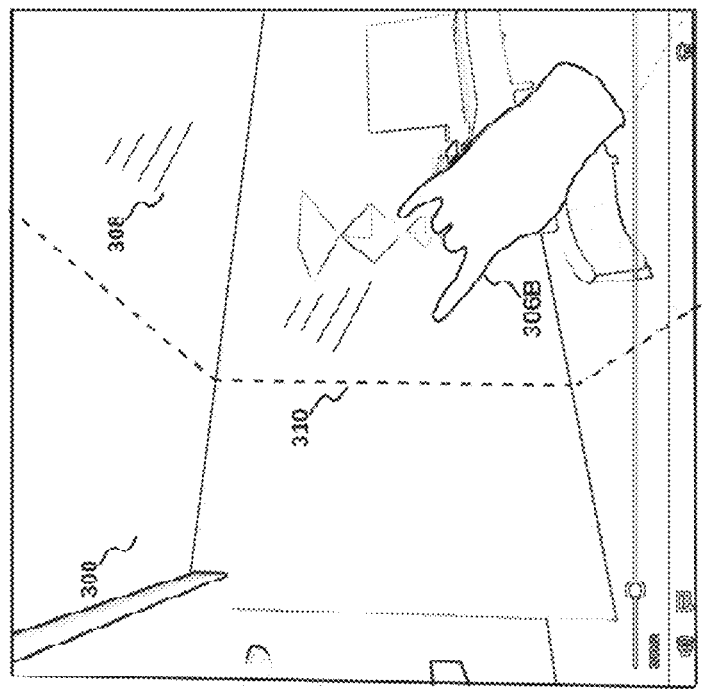
FIG. 3B is an illustration of a view of a mixed reality display of a slice plane within a MR merging system, in accordance with an embodiment.

In accordance with an embodiment, the positioning of the slice plane and/or merge area in operation 204 may be based on a position of the MR merging device 104 relative to the surrounding environment, and may be based on detected objects (e.g., from operation 202 and 203) within the environment. For example, a merge area (e.g., and associated merge volume) may be created and positioned in a real-world room within a volume which is devoid of real-world objects (e.g., so that the merge area and merge volume are associated with an open area and volume in the real-world room). In accordance with an embodiment, the positioning of the slice plane and/or merge area by the client MR merging module 124 may be performed based on rules (e.g., created by a user) that incorporate a relative position of the MR merging device 104 (e.g., within the environment) and the detected objects. In accordance with an embodiment, the rules may specify a position for the slice plane and/or merge area based at least on the relative position of the MR merging device 104 and an analysis of the detected objects. In accordance with an embodiment, the rules may be grouped (e.g., into predefined templates) for positioning a slide plane and/or merge area within commonly occurring environments such as living rooms/entertainment rooms, dining rooms, kitchens, offices and more. For example, based on a detection of a sofa object and a television within an environment (e.g., detected within operation 202 or 203), the client MR merging module 124 may determine that the MR merging device is positioned within a living room, and position a slice plane and merge area based on rules associated with a living room (e.g., having a normal vector for the slice plane pointing at the user, positioning the slice plane between the television and the MR merging device, centering a central pivot point of the slice plane with a center of the television, and placing the merge area in front of the television). Similarly, a detection of a desk and a computer within the detected objects may signify (e.g., based on the rules) that the MR merger device 104 is within an office and initiate a template for positioning a slice plane and merge area within an office (e.g., having a normal vector for the displayed slice plane pointing towards a position of the MR merging device (e.g., at the user), positioning the slice plane normal to the surface of the desk and such that it visually slices the desk (e.g., in two as seen in FIG. 3B and FIG. 3C., centering a central pivot point of the slice plane with a center of the desk or a center of a displayed view, and positioning a merge area that covers the top of the desk).

In accordance with an embodiment, as part of operation 204, the client MR merging module 124 may create a slice plane with an alignment line, wherein the alignment line may be used to align two or more different slice planes (e.g., when aligning slice planes in operation 214). In accordance with an embodiment, the alignment line for a slice plane is a vertical line within the slice plane (e.g., as shown in FIG. 9).

In accordance with some embodiments, a slice plane may be a flat plane (e.g., as shown below in examples in FIG. 3B, FIG. 3C, FIG. 4A, FIG. 4C, FIG. 6, FIG. 8A, FIG. 8B, and FIG. 8C). In accordance with some embodiments, a slice plane may be an irregularly shaped surface in order to combine multiple spaces (e.g., as shown in the example in FIG. 9), and to accommodate a merge area (e.g., as shown in FIG. 4B, FIG. 5B, FIG. 5C, FIG. 5D, and FIG. 5E).

In accordance with an embodiment, the positioning (e.g., including orientation) of the slice plane (and possibly a merge area and merge volume) by the client MR merging module 124 within operation 204 may be performed by a trained artificial intelligence (AI) agent that analyzes the captured environment data (e.g., including any captured data by the sensors 116 and detected objects). The AI agent may be trained prior to the method 200 by exposing the AI agent to captured video data and sensor data from a plurality of environments along with slice plane and merge area placements associated with each environment (e.g., wherein the associated slice plane and merge area placements may be done manually or performed by additional AI agents and given to the AI agent as training data). In accordance with an embodiment, the plurality of environments may include commonly occurring environments such as living rooms/entertainment rooms, dining rooms, kitchens, offices and more. For example, based on receiving data captured within a living room (e.g., within operation 202), a trained AI agent may determine how to place a slice plane (and possibly a merge area and merge volume) based on its training.

In accordance with an embodiment, as part of operation 204, settings for document sharing and object sharing (e.g., as described with respect to FIG. 8A, FIG. 8B, and FIG. 8C as well as the interaction described with respect to operation 214) associated with the slice plane may be set.

In accordance with an embodiment, at operation 205 of the method, the client MR merging module 124 may provide tools (e.g., virtual tools within a display) by which a user of the MR merger device 104 may position a slice plane manually within the display. For example, the provided tools may allow a slice plane to be manually manipulated and placed within the environment (e.g., via a drag and drop method). In addition, the provided tools may define the merge area and merge volume described above in operation 204. For example, the provided tools may allow for the merge area to be outlined via a tracked handheld device (e.g., via pointing of the device) or possibly via an eye tracking technique.

In accordance with an embodiment, at operation 206 of the method 200, the client MR merging module 124 connects with the MR merging server device 130 to access a list of available inbound digital content. The list may include a selection of connections to additional MR merging devices (e.g., 104B, 104C, and 104D as shown in FIG. 1C) which may be in additional environments. In accordance with an embodiment, the list may include thumbnail data for a display, and may include content preview data for a display). In accordance with an embodiment, as part of operation 206, the MR merging server device 130 may display a user interface (e.g., referred to as a content user interface or content UI) that includes a display of the list of available inbound digital content (e.g., including any thumbnails and preview content); wherein the content UI is displayed on the display device 120. For example, the content UI may provide a selection menu that includes the available inbound digital content from the list and which can accept user selections (e.g., via a touch screen input, a hand gesture input, a voice command, or the like). The content UI may include a drop down menu, a scrolling menu and the like to display the list of available inbound digital content for selection (e.g., by a user 102). In accordance with an embodiment, and shown in FIG. 3A, the content UI may be displayed in context within a MR environment (e.g., displayed according to detected objects within the environment), wherein FIG. 3A depicts a view of a digital room 300 as seen via an HMD MR merging device 104 (e.g., as shown in FIG. 1B) in a virtual reality mode. In the example shown in FIG. 3A, the content UI is shown displayed on a desk 304 as a collection of buttons (e.g., 302A, 302B, 302C, 302D, and 302E) which can be interacted with by a digital version a hand (e.g., 306A and 306B) of a user wearing the HMD. Although FIG. 3A depicts a virtual reality mode of the HMD 104 wherein the room 300, desk 304, buttons (302A, 302B, 302C, 302D, and 302E) and hands (306A and 306B) are all displayed digitally, the disclosure described herein is not limited in that regard, rather the disclosure may include an augmented reality mode wherein the room 300, desk 304 and hands 306A and 306B are displayed as they appear in real life (e.g., via a see through AR mode or a pass-through AR mode with video).

In accordance with an embodiment, the MR merging server device 130 may connect to a plurality of MR merging devices 104 in different locations to generate the list of available inbound digital content.

In accordance with an embodiment, at operation 208 of the method 200, the client MR merging module 124 receives a selection representing a choice of inbound digital content from the displayed list of available inbound digital content within the content UI (e.g., from a user interacting with the content UI). For example, this may be a selection from a scrolling menu, or a push of a button from within a VR environment (e.g., as shown in FIG. 3A), or a voice command, or the like. In accordance with an embodiment, and as part of operation 208, the client MR merging module 124 connects with a source of the selected available inbound digital content, wherein the source may include a second client merging module 124 in a second MR merging device in a separate real-world location (e.g., as shown in FIG. 1C) and the MR merging server device 130. The connection between two MR merging devices (e.g., between device 104A and device 104B in FIG. 1C) may be implemented as a direct connection between the two devices over the network 150, or the connection between the two MR merging devices may be implemented via the MR merging server device 130, which acts as a connection server between the two devices (e.g., with the server routing data between the two devices).

In accordance with an embodiment, operation 208 may be performed a plurality of times in order to connect the MR merging device 104 with two or more additional MR merging devices.

Figure 8B:
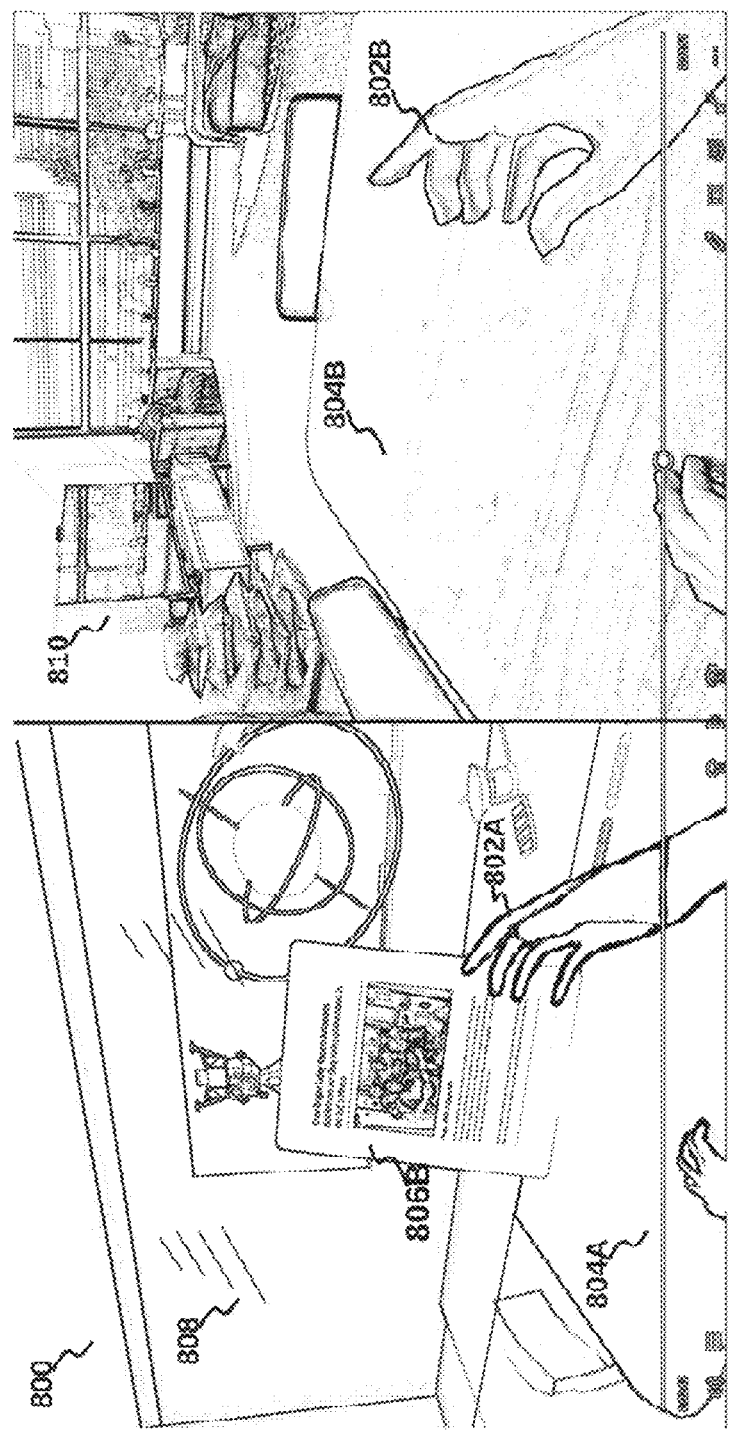
FIG. 8B is an illustration of document sharing within a MR merging system, in accordance with an embodiment.
Figure 8C:
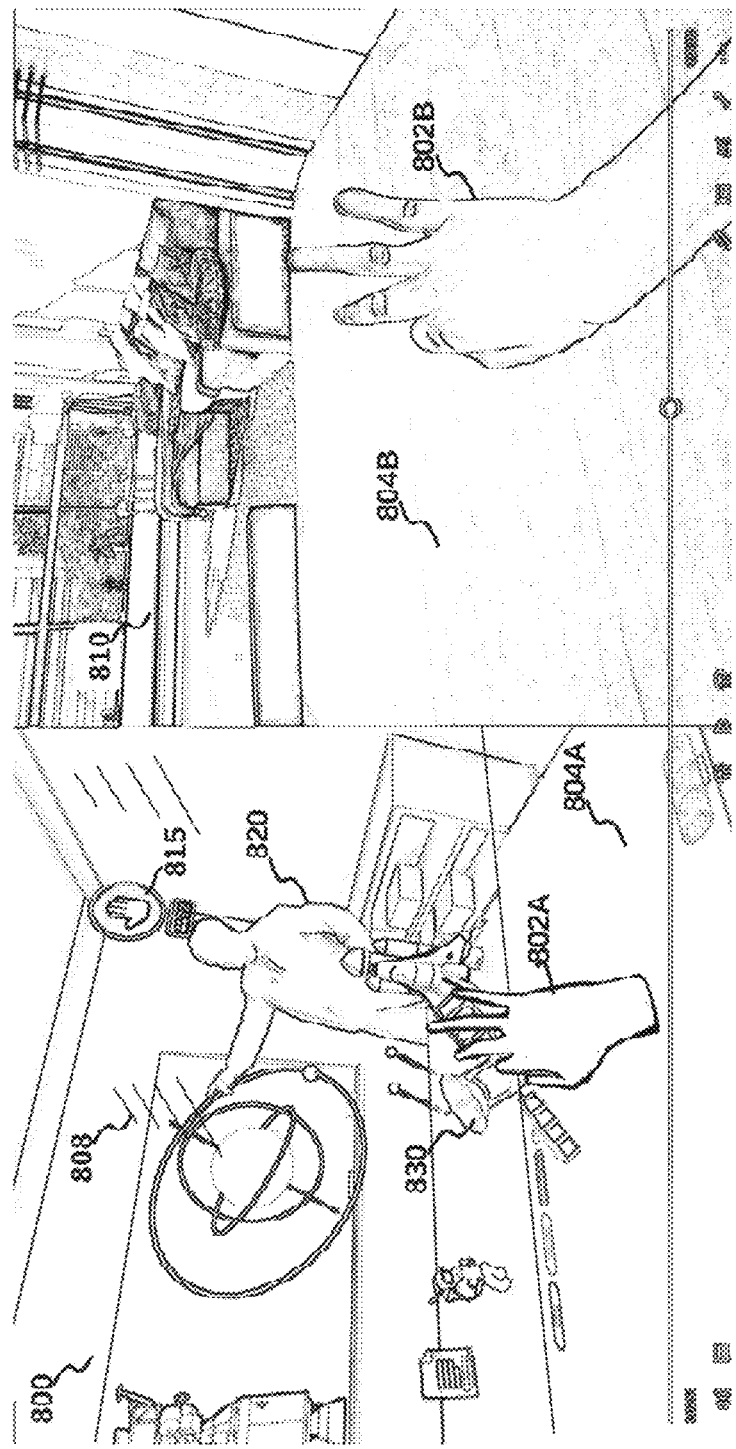
FIG. 8C is an illustration of object sharing within a MR merging system, in accordance with an embodiment.

In accordance with an embodiment, at operation 210 of the method, the client MR merging module 124 communicates with the second MR merging device (e.g., the second MR digital device associated with the selection of inbound digital content determined in operation 208) in order to exchange data. In accordance with an embodiment, the exchanged data includes data collected, modified and generated in operation 202 and 203, wherein the data includes video from the camera 114 and associated generated 3D volumetric data. In accordance with an embodiment, the communication may be a primarily one way communication wherein video and volumetric 3D data is received from the second MR merging device and only minimal data is sent to the second MR merging device (e.g., minimal data including messages, view controls, etc.). For example, this may occur when the MR merging device 104 is used to view live or pre-recorded 3D volumetric data which is downloaded and displayed and requires a minimal amount of uploading (e.g., a displaying of a live or pre-recorded university class as shown in FIG. 8A, FIG. 8B, and FIG. 8C), a displaying of a live broadcast of an event such as a concert (e.g., as shown in FIG. 4C) or sporting event (e.g., as shown in FIG. 4B), and the like.

In accordance with an embodiment, as part of operation 210, the communication may be primarily a two-way communication wherein full 3D volumetric data is sent from the MR merging device 104A to the second (e.g., remote) MR merging device 104B and the inbound digital content data (e.g., 3D volumetric data) is sent from the second MR merging device 104B to the MR merging device 104A. For example, the two-way communication may be used to connect two or more separate households for a discussion or gaming (e.g., the family gathering shown in FIG. 5D or the family game shown in FIG. 5E), and connecting two or more employees for a work meeting (e.g., as shown in FIG. 6), and the like.

In accordance with an embodiment, at operation 212 of the method 200, the client MR merging module 124 processes the inbound digital content (e.g., 3D volumetric data), and displays the content so that it appears (e.g., to a wearer of the HMD MR merging device 104) as if it were on a far side of the slice plane or within the merge volume. The displaying is such that the slice plane and merge volume acts like a window into a second environment, wherein the second environment surrounds the remote second MR merging device 104B (e.g., and is captured in the second MR merging device 104B during operation 202). In accordance with an embodiment, the displaying may include displaying of a shared digital object as described with respect to FIG. 5E. In accordance with an embodiment, at operation 212A of the method 200 (e.g., which may be a part of operation 212), the processing of the inbound digital content may include one or more of the following: digitally removing or covering elements within the video (e.g., the video from operation 202 for the local MR merging device 104A) that correspond to elements within the environment surrounding the local MR merging device 104A that lie on a far side of the slice plane; scaling the inbound content data for display (e.g., to match the displayed inbound content data with a view of the local environment as determined in operation 202); and aligning a displaying of the inbound content data to the environment surrounding the local MR merging device 104A (e.g., aligning one or more alignment lines from different MR merging devices 104 as shown in FIG. 9, and aligning with digital objects in the environment surrounding the local MR merging device 104A). In accordance with an embodiment, the alignment may include a visual warping of displayed visual content in order to align objects across a slice plane. For example, based on an alignment of two different sized items across a slice plane (e.g., such as a desk in FIG. 6, or table in FIG. 9), the client MR merging module 124 may visually warp an area near the slice plane in order for edges of the two different sized items to join seamlessly across the slice plane.

In accordance with an embodiment, while the displaying is described with respect to a HMD MR merging device 104, it should be understood that the disclosure described herein is not limited to HMD devices that resemble glasses. The MR merging device may use other technology to display data to a user; for example, the MR merging device may use technology that displays images directly in the eye of a user (e.g., via contacts or visual implants), or may use projection technology to project the inbound content data.

In accordance with an embodiment, at operation 214 of the method 200, the client MR merging module 124 monitors user interaction with the displayed content (e.g., via the sensors 116, the camera device 114, and the input devices 118), and sends data describing the interaction to the second MR merging device 104B (e.g., as part of operation 210). The monitored interaction includes body movement and gestures from the user 102 which are directed towards or overlap displayed digital objects in the slice plane or merge volume (e.g., including motions to grab, push, pull, touch, select or otherwise interact with the digital objects). The interaction may be captured by a camera 114 (e.g., depth or visual) or may be captured via sensors 116 (e.g., including hand tracking technology). The interaction may also include tracking eye gaze wherein the eye gaze overlaps with digital objects within the slice plane or merge volume.

In accordance with an embodiment, there may be a plurality of MR merging devices 104 in a real-world location that communicate with each other and collectively perform the method 200. For example, a plurality of MR merging devices 104 may sync together (e.g., across the network 150 or directly with technology such as Bluetooth) in order to capture and create a digital version of the environment as described in operation 202 and 203. Similarly, the plurality of MR merging devices 104 may collectively do the following: create and position a common slice plane and merge area as described in operation 204, display a list of available inbound digital content as described in operation 206, connect and communicate with an additional MR merging device (e.g., a MR merging device in a remote location) as described in operation 208 and 210, and process, display, and interact with the data from the additional MR merging device as described in operation 212, 212A and 214. This allows for a many to one, one to many, or many to many connection and sharing of data.

In various embodiments, some of the method 200 elements shown in FIG. 2 may be performed concurrently, in a different order than shown, or may be omitted.

In accordance with an embodiment, and shown in FIG. 3B and FIG. 3C is an illustration of a view from a HMD MR merging device 104, wherein a positioning and displaying of a slice plane in a room 300 is being performed (e.g., as described with respect to operation 204). The view shown in FIG. 3B and FIG. 3C includes a display of a room 300 which is a representation of a real-life room (e.g., a digital representation of a real-life room as displayed within a HMD in virtual reality mode). The view shown in FIG. 3B and FIG. 3C also includes a slice plane 308, an intersection 310 of the slice plane 308 with the room 300, and a digital hand 306B (e.g., representing a hand of a wearer of the HMD 104 which may be tracked by device sensors 116). In accordance with an embodiment, the displayed view in FIG. 3B and FIG. 3C may be an entirely virtual display within a VR HMD (e.g., with an opaque visor 160 as described in FIG. 1B) wherein the room 300 and all other elements of the view are digitally generated objects. In accordance with another embodiment, the displayed view in FIG. 3B and FIG. 3C may be an entirely virtual display within a VR HMD (e.g., with an opaque visor 160 as described in FIG. 1B) wherein the room 300 (e.g., and all furniture) is a displayed video captured from a device camera 114 (e.g., in pass-through mode), while other elements in the view (e.g., the hand 306B, the slice plane 308, the intersection 310, and a content UI 302E) are digitally generated objects overlaid on the video. In still another embodiment not shown in FIG. 3B and FIG. 3C, a displayed view similar to that shown in FIG. 3B and FIG. 3C may be a partially virtual display within an AR HMD (e.g., with a transparent visor 160 as described in FIG. 1B) wherein the room 300 (e.g., and all furniture) and a real human hand is seen through the visor 160, while other elements in the view (e.g., the slice plane 308, the intersection 310, and the content UI 302E) are digitally generated objects overlaid on the visor to align with the room.

Figure 4A:
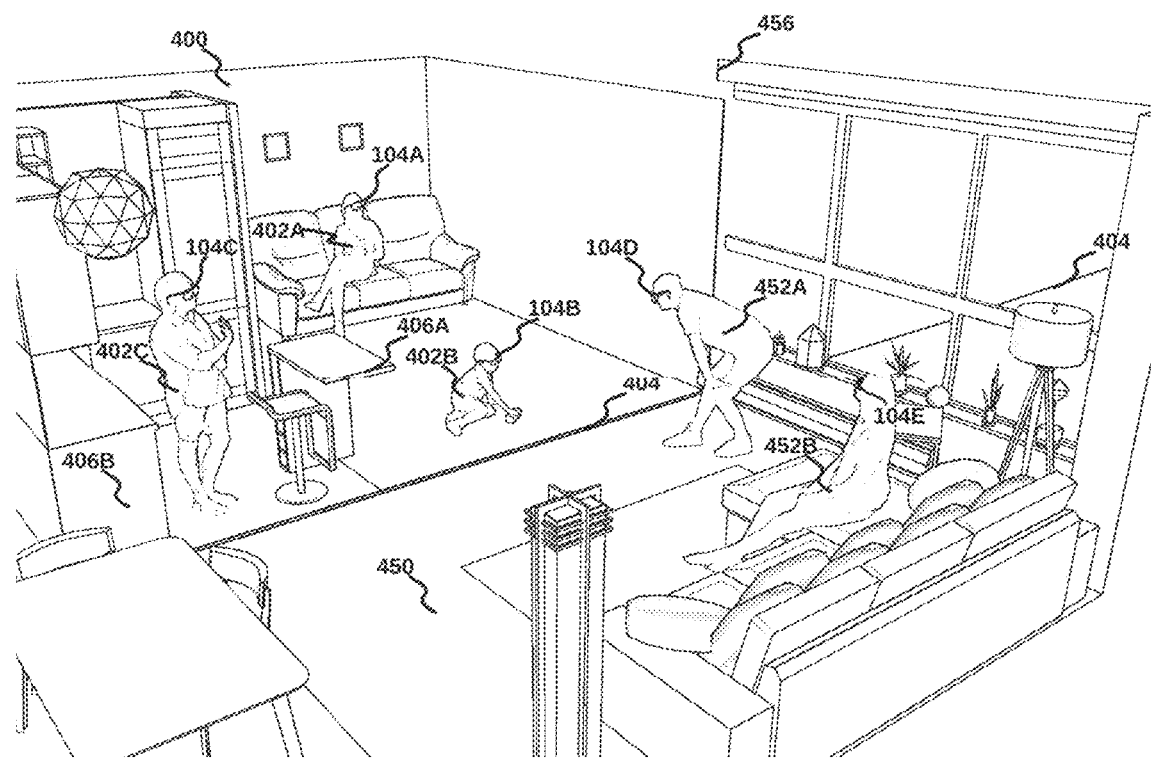
FIG. 4A is an illustration of an example two-way connection between two MR merging devices within a MR merging system, in accordance with an embodiment.
Figure 4B:
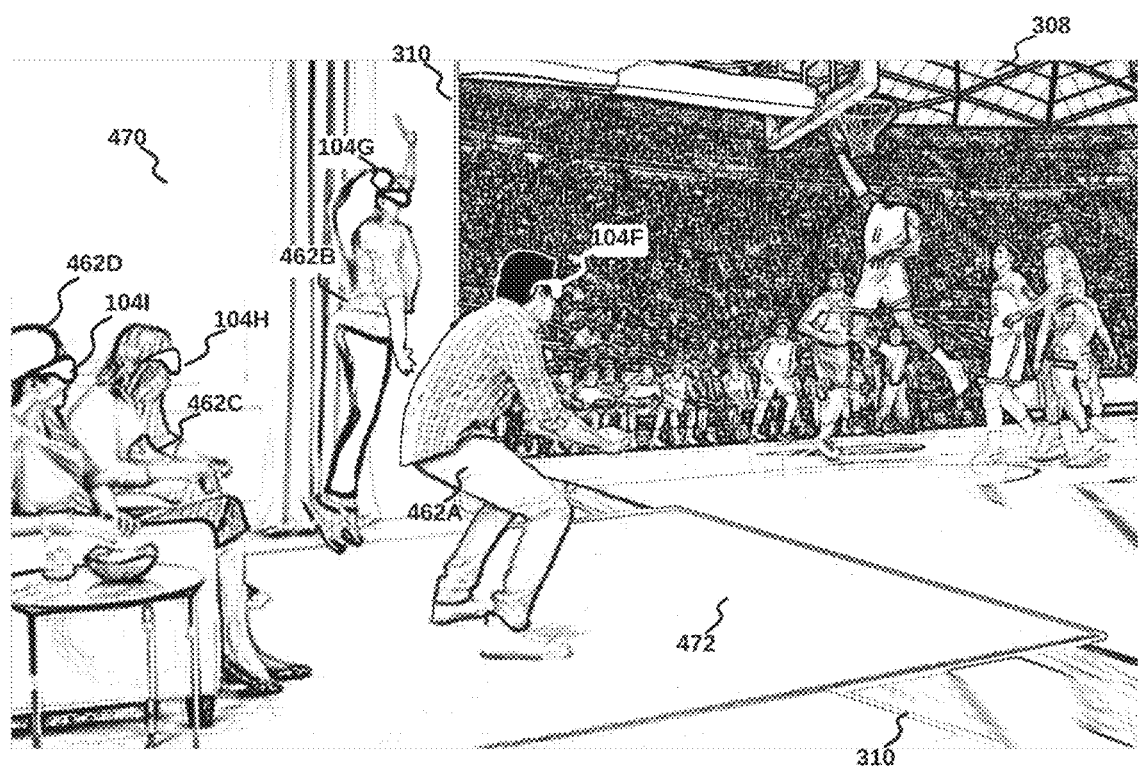
FIG. 4B is an illustration of an example one-way connection between two MR merging devices within a MR merging system, in accordance with an embodiment.
Figure 4C:
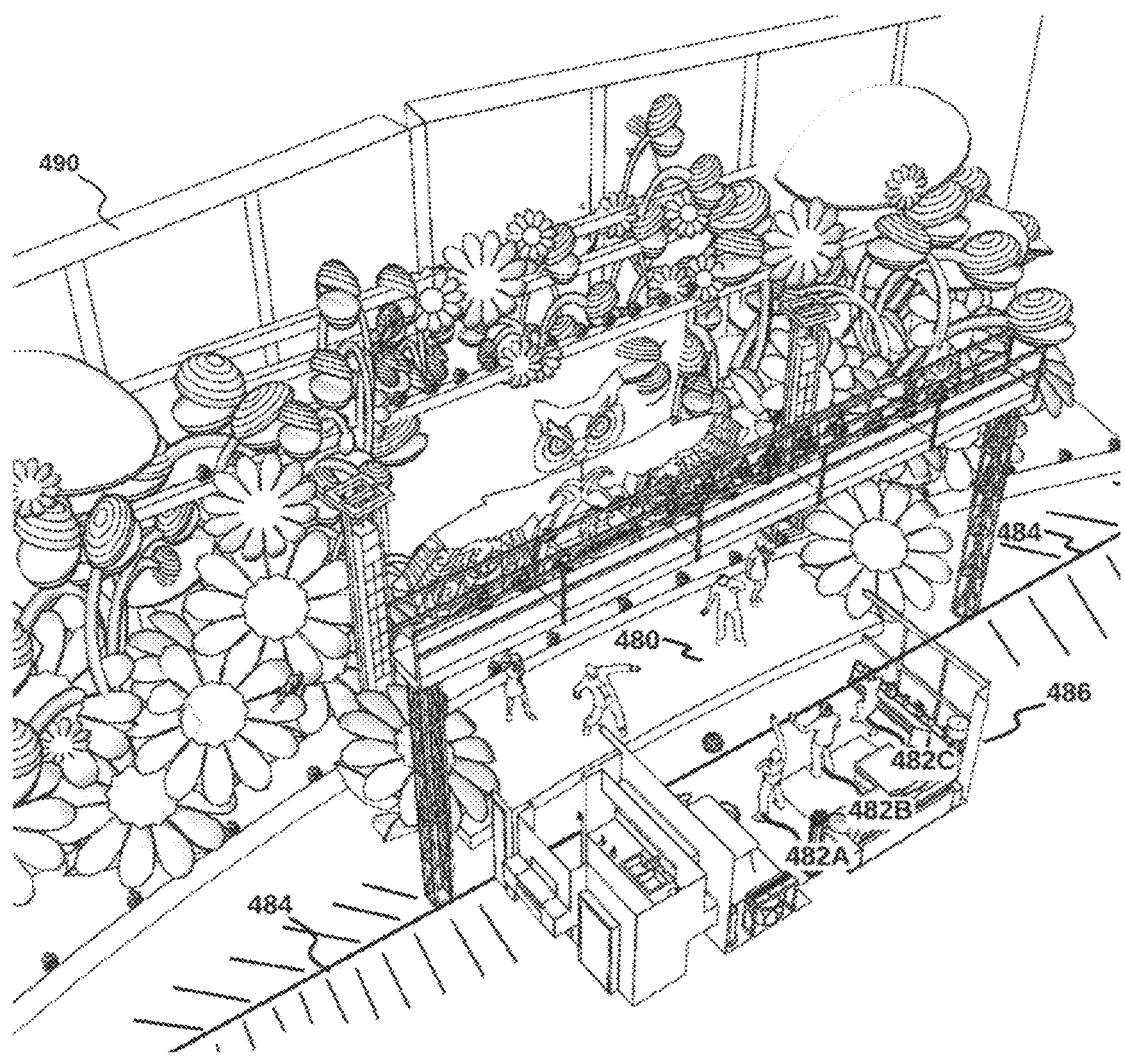
FIG. 4C is an illustration of an example one-way connection between two MR merging devices within a MR merging system, in accordance with an embodiment.

In accordance with an embodiment, and shown in FIG. 4A is an example illustration of a two-way connection (e.g., using the method 200) between a first room 400 and a second room 450 as seen within an HMD merging device 104, wherein the first room 400 and second room 450 are in different real-world locations. In accordance with an embodiment, the two-way connection may be between a first set of MR merging devices (e.g., 104A, 104B, and 104C which may be similar to the HMD 104 shown in FIG. 1B) worn by a first set of people 402A, 402B, 402C (e.g., which are all similar to the user 102) in the first room 400 with a second set of MR merging devices (e.g., 104D and 104E which may be similar to the HMD 104 shown in FIG. 1B) worn by a second set of people (e.g., 452A, and 452B which are all similar to the user 102) in the second room 450. In accordance with an embodiment, a slice plane 404 merges (e.g., according to the method 200) the first room 400 with the second room 450 such that the first set of MR merging devices (e.g., 104A, 104B, and 104C) display the second room 450 at the slice plane 404, and the second set of MR merging devices (e.g., 104D and 104E) display the first room 400 at the slice plane 404. In accordance with an embodiment, based on the first room 400 and the second room 450 being different sizes, a room may be displayed with parts being cut off (e.g., a table 406A, a counter 406B, and a window 456).

In accordance with an embodiment, and shown in FIG. 4B is an example illustration of a one-way connection (e.g., using the method 200) between a first set of MR merging devices (e.g., 104F, 104G, 104H, and 104I which may be similar to the HMD 104 shown in FIG. 1B) worn by a first set of people 462A, 462B, 462C, and 462D (e.g., which are all similar to the user 102) in a room 470 with a second MR merging device 104 (not shown in the FIG. 4B) in a distant location wherein a basketball game is occurring. In accordance with the example shown in FIG. 4B, the basketball game is being captured (e.g., as described in operation 202) by the second MR merging device 104 and sent (e.g., as described in operation 210) to the first set of MR merging devices (e.g., 104F, 104G, 104H, and 104I) for display (e.g., as described in operation 212) on the slice plane 308 such that the first set of people (462A, 462B, 462C, and 462D) experience a view on the slice plane 308 which may be equivalent to a courtside seat. In accordance, there may also be a merge area 472 as described in operation 204 and 205 which may allow a user (e.g., 462A and 462B) to overlap with the displayed basketball game. In accordance with an embodiment, the basketball game may be captured with volumetric cameras (not shown) and sent to the first set of MR merging devices (e.g., 104F, 104G, 104H, and 104I) via a MR merging server device 130.

In accordance with an embodiment, and shown in FIG. 4C is an example illustration of a bird's eye view of a one-way connection (e.g., using the method 200) as seen within an HMD merging device 104 between a first set of MR merging devices worn by a first set of people 482A, 482B, and 482C (e.g., which are all similar to the user 102) in a room 486 with a second MR merging device 104 (not shown in the FIG. 4C) in a distant location wherein a band is performing on a stage 480 in a concert. In accordance with the example and shown in FIG. 4C, the concert may be captured (e.g., as described in operation 202) by the second MR merging device 104 and sent (e.g., as described in operation 210) to the first set of MR merging devices worn by the first set of people (482A, 482B, and 482C) for display (e.g., as described in operation 212) on the slice plane 484 such that the first set of people (482A, 482B, and 482C) experience a view on the slice plane 484 which may be equivalent to a front row seat as shown. In accordance with an embodiment, the concert may be captured with volumetric cameras (not shown) and sent to the first set of MR merging devices worn by the first set of people (482A, 482B, and 482C) via a MR merging server device 130.

Figure 5A:
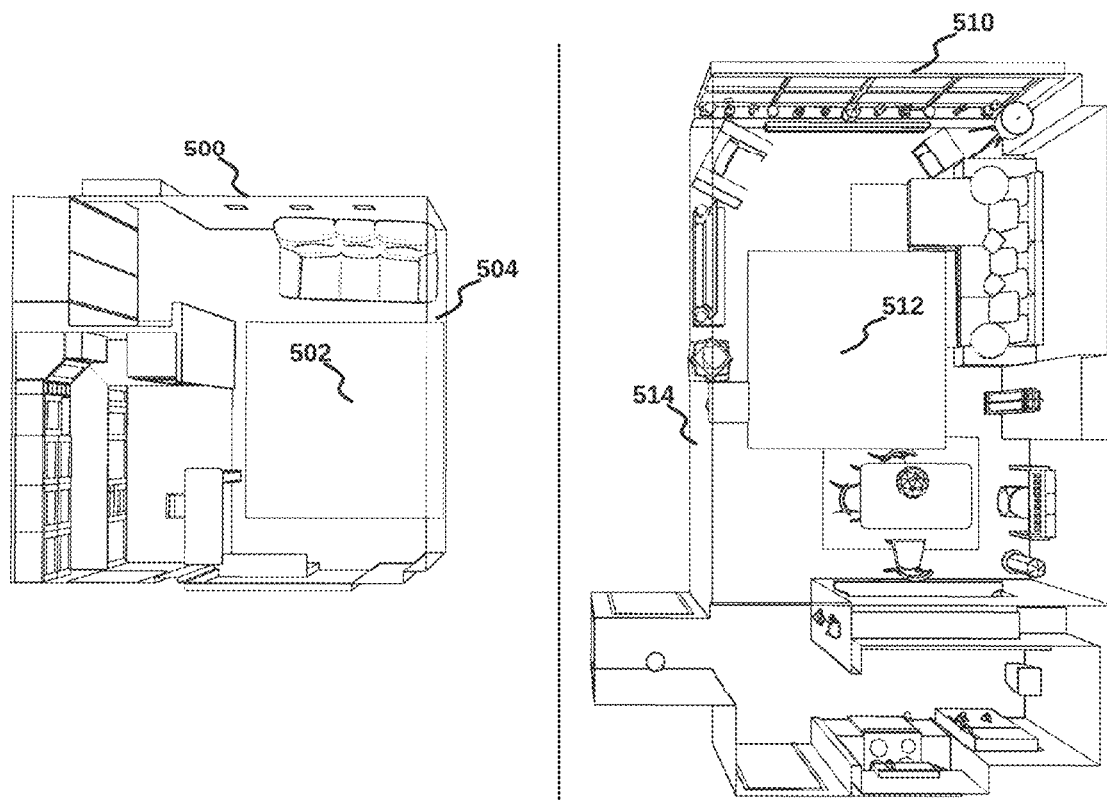
FIG. 5A is an illustration of two rooms showing two interaction merge areas captured by two MR merging devices within a MR merging system, in accordance with an embodiment.

In accordance with an embodiment, and shown in FIG. 5A is a bird's eye view illustration of a first room 500 and a second room 510. While the two rooms are shown side by side in FIG. 5A for ease of explanation, during an execution of the method 200, the first room 500 and the second room 510 may be in two separate real-world locations (e.g., and within a larger structure such as a house or apartment building). Furthermore, the illustration shows a cut view of the first room 500 at a first slice plane 504, wherein the first slice plane 504 is determined according to operation 202 and 204 (e.g., by a first MR merging device 104 worn by a first user 102 in the first room 510). Similarly, the illustration shows a cut view of the second room 510 at a second slice plane 514, wherein the second slice plane 514 is determined according to operation 202 and 204 (e.g., by a second MR merging device 104 worn by a second user 102 in the second room 510). In accordance with an embodiment, as described in operation 204 and 205 of the method 200, a first merge area 502 may be determined in the first room 500, and a second merge area 512 may be determined in the second room 510 (e.g., as described in operation 204 and 205). In accordance with an embodiment, the determination of the first merge area 502 and the determination of the second merge area 512 may include an exchange of captured environment data between the first MR merging device and the second MR merging device in order to determine a size of merge area which works for both the first room 500 and the second room. The first merge area 502 and the second merge area 512 are merge areas which may be overlapped during operation 212 and 214.

Figure 5B:
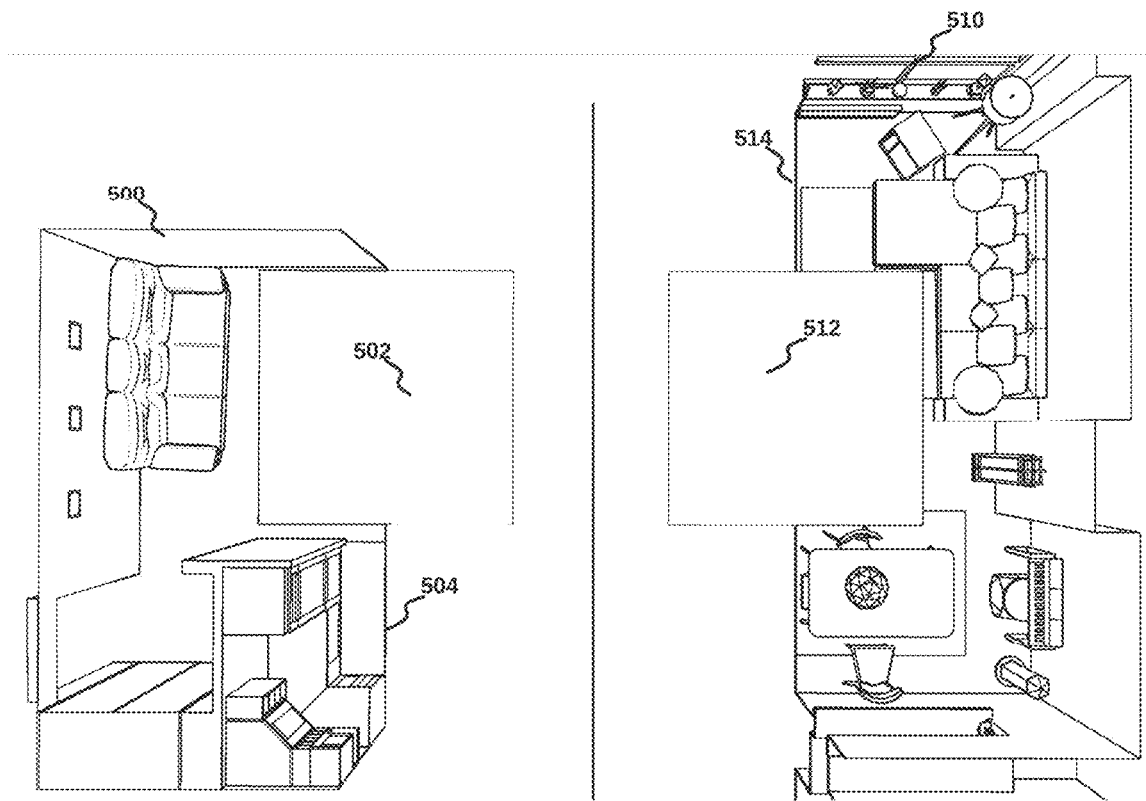
FIG. 5B is an illustration of two rooms showing two interaction merge areas captured by two MR merging devices within a MR merging system, in accordance with an embodiment.

In accordance with an embodiment, and shown in FIG. 5B, the first slice plane 504 and first merge area 502 may be determined (e.g., within operation 204 and 205) such that the first merge area 502 extends beyond the first slice plane 504. Similarly, as shown in FIG. 5B, the second slice plane 514 and second merge area 512 may be determined (e.g., within operation 204 and 205) such that the second merge area 512 extends beyond the second slice plane 514. In accordance with an embodiment, and as shown in FIG. 5B, the first merge area 502 and the second merge area 512 may be the same size and shape (e.g., in order to simplify an overlapping of the first and second merge areas during operation 212 and 214).

Figure 5C:
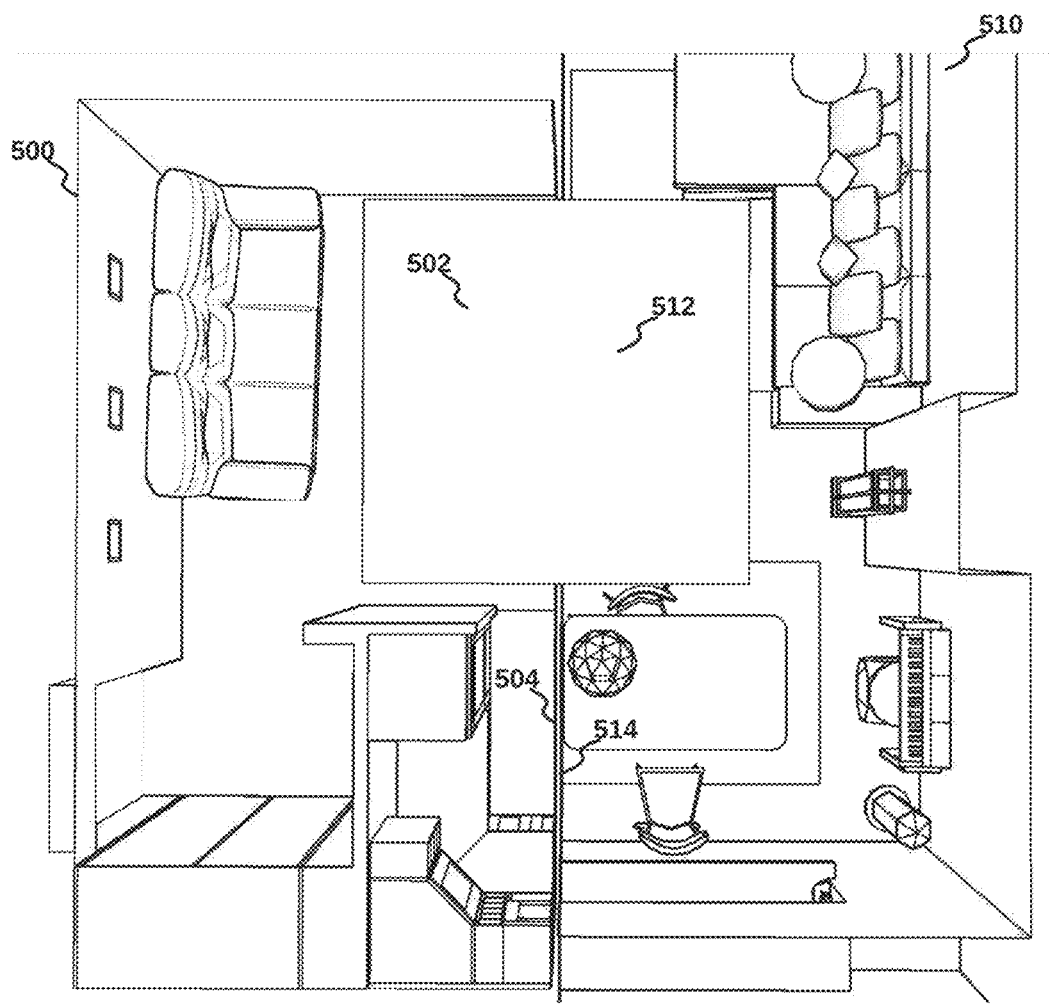
FIG. 5C is an illustration of two rooms showing two overlapping interaction merge areas within a MR merging system, in accordance with an embodiment.

In accordance with an embodiment, and shown in FIG. 5C, is a bird's eye view of the first room 500 and the second room 510 from FIG. 5B, wherein the first merge area 502 and the second merge area 512 overlap (e.g., as seen from within an HMD merging device 104), and wherein the first slice plane 504 and the second slice plane 514 are also overlapped (e.g., aligned in space so that, for example, they become a common slice plane) to form a common slice plane (e.g., wherein the overlap may be determined during operation 212). The extended merge area beyond the slice plane (e.g., as shown in FIG. 5B) may facilitate an overlapping of the displaying of the first merge area 502 and the second merge area 512 during operation 212 and 214. FIG. 5C shows an overlapping of the first merge area 502 and the second merge area 512 wherein the first slice plane 504 and the second slice plane 514 are aligned (e.g., as done in operation 212). A first user in the first room 500 or on the first merge area 502 (first user not explicitly shown in FIG. 5C), may be seen by a second user in the second room 510 or in the second merge area 512 (second user not shown in FIG. 5C), and vice versa. In accordance with an embodiment, the overlapping of the first merge area 502 and the second merge area 512 may facilitate an interaction of the first user in the first room 500 and the second user in the second room 510. While not shown in FIG. 5C the first user is in a first real-world location, and the second user is in a second real-world location.

Figure 5D:
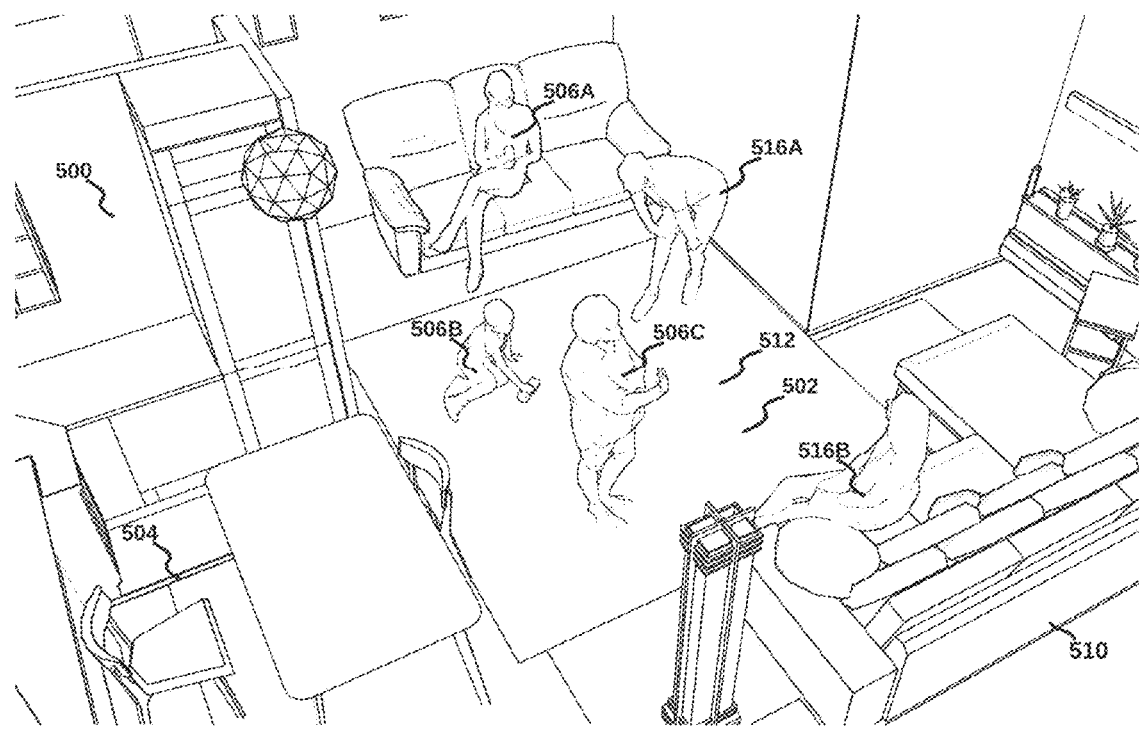
FIG. 5D is an illustration of two rooms connected by a MR merging system, in accordance with an embodiment.
Figure 6:
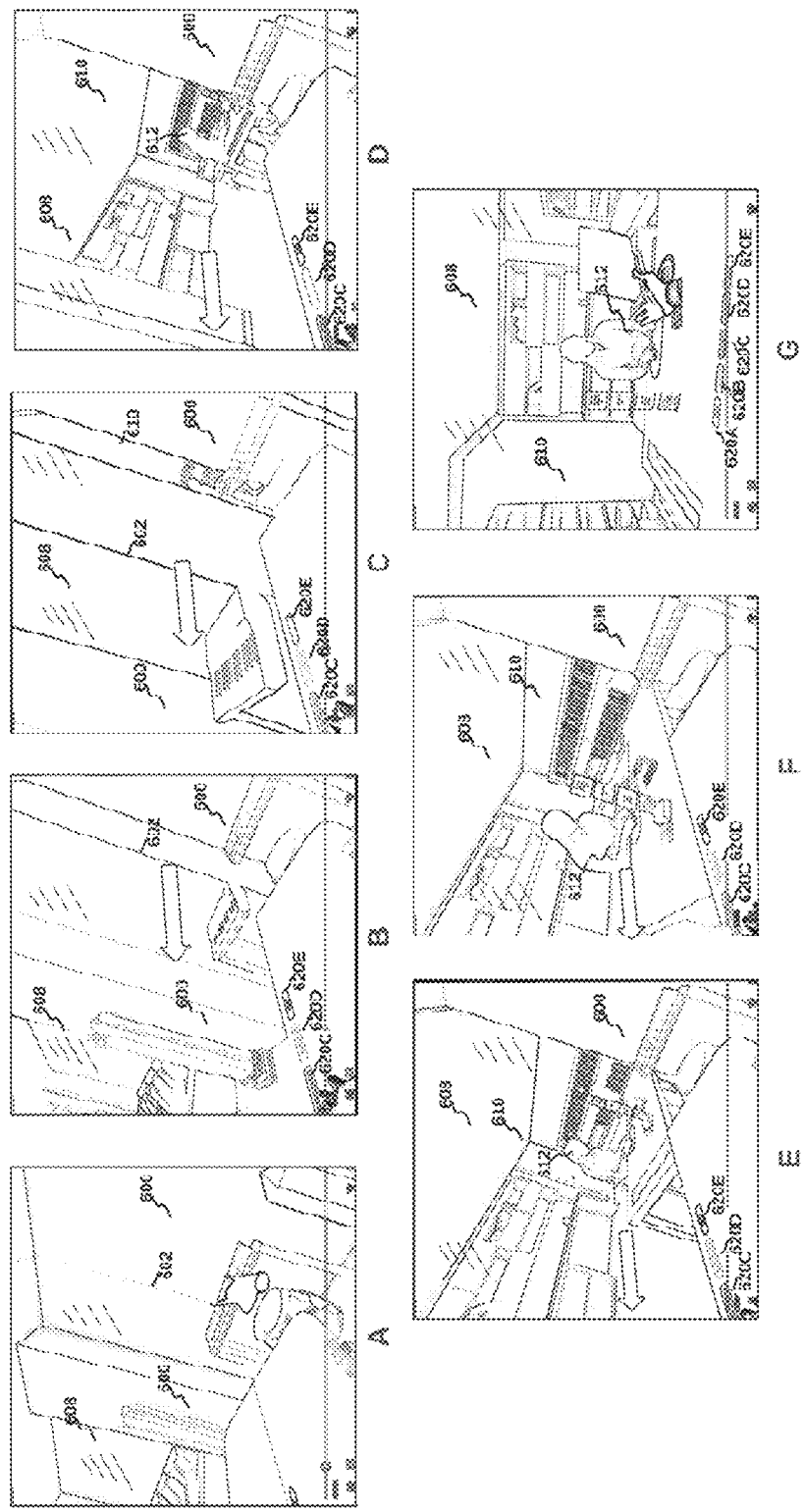
FIG. 6 is an illustration of a plurality of panels depicting lateral motion of a slice plane within an MR merging system, in accordance with an embodiment.

In accordance with an embodiment, and shown in FIG. 5D, is an illustration of the overlap shown in FIG. 5C with a first set of three users (506A, 506B, and 506C) from the first room 500 and a second set of two users (516A and 516B) from the second room 510 using the shared overlapping merge areas 502 and 512. The illustration shown in FIG. 5D is seen from within a HMD merge device 104 wherein part of the first room 500 on a first side of the common slice plane (504 and 514), part of the second room 510 on a second side of the common slice plane (504 and 514), and the overlapped merge areas 502 and 512 are seen by all users (506A, 506B, 506C, 516A, and 516B). The rooms (500 and 510) and users (506A, 506B, 506C, 516A, and 516B) may be similar to the rooms (400 and 450) and the users (402A, 402B, 402C, 452A, and 452B) shown in FIG. 4A with the addition of the overlapping merge areas 502 and 512.

Figure 5E:
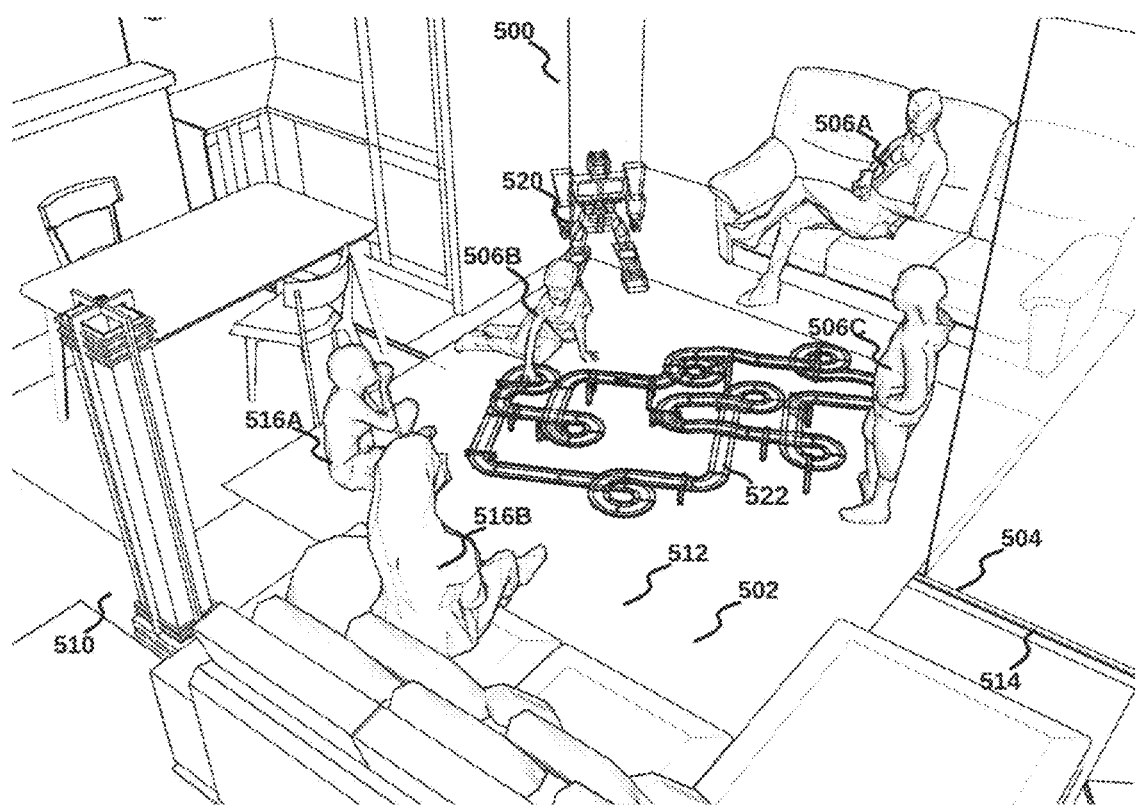
FIG. 5E is an illustration of two rooms connected by a MR merging system showing shared interaction with digital objects, in accordance with an embodiment.

In accordance with an embodiment, FIG. 5E is similar to FIG. 5D as seen from a different point of view and with different users. As shown in FIG. 5D, one or more digital objects (e.g., 520 and 522) may be seen by (e.g., displayed as described in operation 212) and shared (e.g., interacted with as described in operation 214) by both the a first set of three users (506A, 506B, and 506C) from the first room 500 and the second set of two users (516A and 516B) from the second room 510 when placed in the first merge area 502 or the second merge area 512.

Sliding Display Operations for Slice Planes

In accordance with an embodiment, and shown in FIG. 6, the MR merging method 200 may include operations for changing (e.g., swapping) displayed content seen through a slice plane from a first inbound content to a second inbound content. In accordance with an embodiment, the illustrations in FIG. 6 are shown from a perspective of a first user wearing an HMD merging device 104 in a first room 600. In accordance with an embodiment, the changing of displayed content as shown in FIG. 6 may be initiated by a swiping gesture from the first user. In accordance with an embodiment, the changing of the display may be part of the processing and displaying of inbound content data within operation 212 of the method 200. The operations for changing the displayed content may include sliding operations wherein a first inbound content displayed through a slice plane is displaced laterally by a second inbound content after a swiping gesture by a user. In accordance with an embodiment, FIG. 6 includes 7 panels labeled 'A' to 'G' which depict a time progression for a view in a MR merging device 104 (e.g., a view seen by a user wearing an HMD merging device 104). The view begins in panel 'A' with a view of a room 600, a slice plane 608 and an intersection 602 which may be similar to the room 300, slice plane 308, and intersection 310 described in FIG. 3A, FIG. 3B, and FIG. 3C. In accordance with an embodiment, as shown in panel 'B' and 'C' of FIG. 6, and as part of the sliding operations, the client MR merging module 124 may laterally displace (e.g., slide to the left in FIG. 6) a display of part of the room 600 which is displayed on the slice plane 608 (e.g., displayed during operation 212 of the method 200) and which is displayed such that it appears to be sliced at the intersection 602. Panel 'C' and 'D' further show the lateral movement of the display on the slice plane 608 and show an emergence of a second room 610 with a second displayed user 612, wherein the second room 610 and the second displayed user 612 are a displaying of inbound digital content received during operation 208 and 210 of the method 200 (e.g., the inbound digital content describing the second room 610 may be received from a second MR merging device 104 worn by a second user 612 at a real-world location which is separate from a real-world location of the first user). In accordance with an embodiment, panels 'E', 'F', and 'G' show a continuation of the lateral movement until the second room 610, and the second displayed user 612 are aligned with the view of the MR merging device 104 (e.g., the view seen by a user wearing an HMD merging device 104 using an alignment line).

In accordance with an embodiment, although FIG. 6 shows a sliding operation that changes a display on the slice plane 608 from a user's current room 600 to a second room 610. It should be understood that the sliding operation can change a display on the slice plane 608 from any available inbound content to any other available inbound content.

In accordance with an embodiment, the sliding operations may be initiated by pushing a button to select inbound digital content associated with the second room 610, wherein the button is part of a content UI displayed on a desk in the room 600 as a collection of buttons (e.g., 620A, 620B, 620C, 620D and 620E). In accordance with an embodiment, the displayed content UI including the collection of buttons (e.g., 620A, 620B, 620C, 620D and 620E), which may be similar to the displayed content UI and collection of buttons (302A, 302B, 302C, 302D, and 302E) shown and described with respect to FIG. 3A.

Widget Mode

Figure 7:
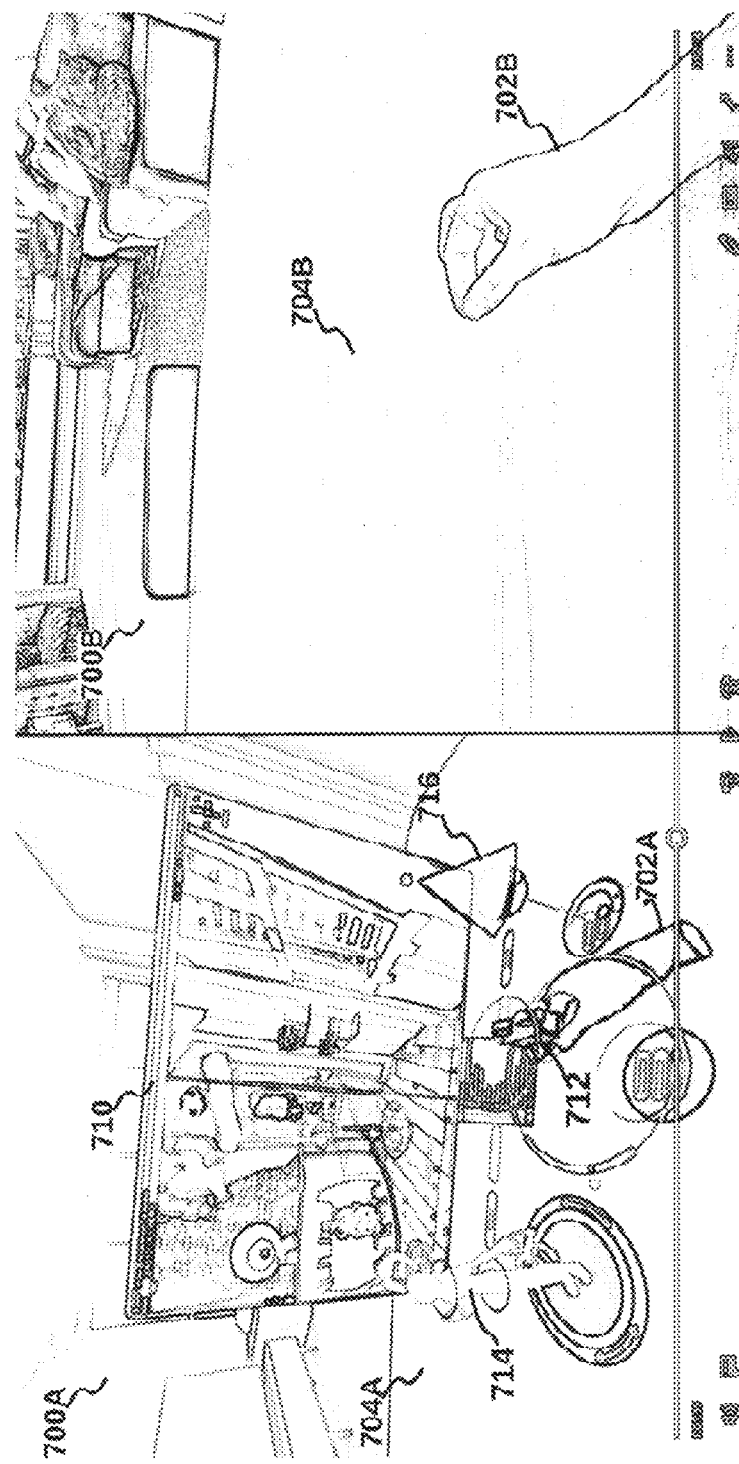
FIG. 7 is an illustration of a plurality of widgets controlling aspects within an application within a MR merging system, in accordance with an embodiment.

In accordance with an embodiment, and shown in FIG. 7, the client MR merging module 124 may operate within a 'Widget mode' during operation 214. The Widget mode may include a displaying of one or more widgets (e.g., 712, 714, 716) and a displaying of an application window 710 in a view of the MR merging device 104 display device 120 (e.g., as shown on the left side of FIG. 7, while the right side of FIG. 7 shows an associated real world view of a user wearing the MR merging device 104). In accordance with an embodiment, the display within the application window 710 may be inbound content data. In accordance with an embodiment, the application window 710 may be displayed on the slice plane (or a part thereof) and the widgets (e.g., 712, 714, 716) may be displayed within reach of a digital hand 702 of a user. Each one of the displayed widgets may connect to a feature within an application (e.g., a software application) that generates an output for the application window 710. In accordance with an embodiment, in Widget mode, the client MR merging module 124 receives, from the application, 3D model data for displaying the one or more widgets. The client MR merging module 124 then displays the one or more widgets as 3D objects within the display device 120 of the MR merging device 104 (and within an environment surrounding the MR merging device 104) as shown in the left side of FIG. 7. The one or more displayed widget objects may then be manipulated by a hand 702B of a user via an associated virtual hand 702A. As part of operation 714, the client MR merging module 124 monitors an interaction of the virtual hand 702A with a displayed widget object and sends the interaction data to the application for processing. The application processes the interaction data and updates the display of the application window based on an output from the application (e.g., wherein the update includes any effects caused by the interaction). In accordance with an embodiment, each widget may control an aspect of the application and may also control the display within the application window 710. For example, as shown in FIG. 7, the virtual hand 702A may move a camera widget 712 (e.g., a 3D digital object resembling a small camera which is displayed as floating within an environment surrounding the MR merging device 104) which may control a virtual camera that renders (e.g., rendering performed within the application) a scene within the application window 710 such that the camera widget 712 controls a view into the scene (e.g., the camera widget 712 is a remote camera control). As another example, a displayed light widget 716 may also be manipulated by the virtual hand 702A (e.g., rotated, laterally moved, etc.), with the manipulation data sent to the application, whereby the application processes the manipulation data to update the application window 710 display and adjust a lighting in the scene associated with the light widget 716 (e.g., position and orientation of the light widget 716 in the environment surrounding the MR merging device 104 controls lighting within the application window 710 via a rendering within the application).

Document Sharing

In accordance with an embodiment, FIG. 8A and FIG. 8B are illustrations showing document sharing across a slice plane wherein a first user (e.g., using a first MR merging device) is on a first side of the slice plane, and a second user (e.g., using a second MR merging device) is on a second side of the slice plane. In accordance with an embodiment, a slice plane may be used to share a document between distant spaces (e.g., two distant real-world spaces) by moving the document across the slice plane based on document sharing settings created in operation 204 of the method 200 (e.g., the moving of the document across the slice plane being part of an interaction within operation 214 of the method 200). In accordance with an embodiment, the document may be represented by a document object (806A in FIG. 8A) displayed in the environment via the MR merging device. In accordance with an embodiment a position of the document object may be monitored (e.g., via a camera or sensor) in order to detect a crossing of the slice plane. In accordance with an embodiment, the position of the document object may be determined by monitoring a position of a hand manipulating the document object. In accordance with an embodiment, FIG. 8A shows a side by side view of a real world view (right side) and an associated view through a MR merging device 104 display device 120 (left side) (e.g., via a HMD MR merging device 104). The real world view includes a room 810, a table 804B and a hand 802B (e.g., a user's hand) seen from a point of view of a user (e.g., a user wearing an HMD MR merging device 104). The MR merging device 104 display view includes an example view from operation 214 wherein inbound content data describing a room 800 (e.g., a classroom) is displayed through a slice plane 808 (e.g., wherein the room 800 is based on data from an additional MR merging device 104 which is in a distant real-world location). In accordance with an embodiment, during operation 214 of the method 200, the virtual hand 802A interacts (e.g., grabs, holds, selects, etc.) a document object 806A through a slice plane 808 based on the document object 806A being accessible to the user (e.g., based on the user having access permission). In accordance with an embodiment, the document 806A may be displayed to appear within the room 800 and may be interacted with through the slice plane 808 (e.g., the virtual hand may appear to pass through the slice plane 808 and grab the document 806A). In accordance with an embodiment, after an initial interaction with the document 806A (e.g., the grabbing), at operation 210 of the method 200, the client MR merging module 124 may access (e.g., download) data describing the document (e.g., data within the document), and as shown in FIG. 8B displays the contents of the document 806B (e.g., a news article) in the MR merging device 104 display device 120.

Object Sharing

In accordance with an embodiment, FIG. 8C is an illustration showing object sharing (e.g., 3D digital object sharing) across a slice plane wherein a first user (e.g., using a first MR merging device) is on a first side of the slice plane, and a second user (e.g., using a second MR merging device) is on a second side of the slice plane. In accordance with an embodiment, a slice plane may be used to share a 3D digital object between distant spaces (e.g., two distant real-world spaces) by moving the 3D digital object across the slice plane (e.g., from the first side of the slice plane to the second side of the slice plane) based on object sharing settings created in operation 204 of the method 200. In accordance with an embodiment a position of the object may be monitored (e.g., via a camera or sensor) in order to detect a crossing of the slice plane. In accordance with an embodiment, the position of the object may be determined by monitoring a position of a hand manipulating the object. In accordance with an embodiment, FIG. 8C shows a side by side view similar to that in FIG. 8A and FIG. 8B, but from a different view angle of the room 800 (e.g., a different orientation of the HMD MR merging device 104), such that the view includes a teacher 820 (e.g., and displayed through a slice plane 808 during operation 214). Inbound content data to describe the room 800 (e.g., including the teacher 820) may be pre-recorded volumetric data of a class, and may be live volumetric data of a class (e.g., a one-to-many broadcasting of a class by the teacher 820 to a plurality of students). Based on the class being broadcast in a live mode, there may be a visual indication 815 provided by the client MR merging module 124 as to a number of students watching the class.

In accordance with an embodiment, during operation 214 of the method 200, and as part of the object sharing, a virtual hand 802A interacts with (e.g., grabs, holds, selects, etc.) a 3D digital object 830 through the slice plane 808 based on the 3D digital object 830 being accessible to the user (e.g., based on the user having access permission). In accordance with an embodiment, after an initial interaction with the 3D digital object (e.g., the grabbing via the slice plane 808), at operation 210 of the method 200, the client MR merging module 124 may access data describing the 3D digital object, and further interact with the 3D digital object (e.g., open the 3D object to see an internal structure).

Display and Interaction Permission

In accordance with an embodiment, displaying of incoming content, and sharing of documents and objects via a slice plane may include access and display permissions. For example, a document or object may only be shared across a slice plane when permission to do so exists (e.g., is provided by a user). For example, data describing a room on one side of a slice plane may not have permission to be displayed on a second side of the slice plane (e.g., for privacy reasons) and may be replaced with a display of a generic digital room.

In accordance with an embodiment, object sharing and document sharing may occur in any direction across a slice plane.

Group Slice Planes

In accordance with an embodiment, and as shown in FIG. 9, the method 200 may be used to create a combined display of inbound content data from a plurality of different sources (e.g., from a plurality of different MR merging devices at different real-world locations). This allows for a plurality of participants to communicate using the MR merging system. For example, during operation 208 of the method 200, the client MR merging module 124 within a local MR merging device 104 may receive a selection of three different inbound content sources (e.g., from a local user of the local MR merging device 104 choosing to connect with three family members that each have a MR merging device 104 in different real-world locations). Continuing with the example, at operation 210 of the method, the client MR merging module 124 of the local MR merging device may connect with, access (e.g., download) inbound content data from the three different inbound content sources, and upload content data (e.g., from the local MR merging device 104) to the three different sources. Continuing with the example, and in accordance with an embodiment, during operation 212 of the method, the client MR merging module 124 of the local MR merging device 104 would display all three different inbound content data through a plurality of slice planes. In accordance with an embodiment, as part of operation 212A, and as shown in FIG. 9, the client MR merging module 124 in the local MR merging device 104 may align the displaying of the plurality of slice planes by aligning an alignment line 940 (e.g., as created during operation 205 of the method 200) for each of the three different inbound content sources with an alignment line 940 for the local MR merging device 104 (the alignment line 940 is shown for clarity of understanding and may not be displayed during operation). In accordance with an embodiment, and as shown in FIG. 9, the volume surrounding the aligned alignment line 940 may be split evenly between the three inbound content sources and the local MR merging device 104 creating four spaces (e.g., 900, 910, 920, and 930) and connecting four users 902 (e.g., a local user), 912, 922, and 932. While the above example uses three different sources, the method is not limited to three different sources.

While illustrated in the block diagrams as groups of discrete components communicating with each other via distinct data signal connections, it will be understood by those skilled in the art that the various embodiments may be provided by a hardware combination of and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (Saas). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 10:
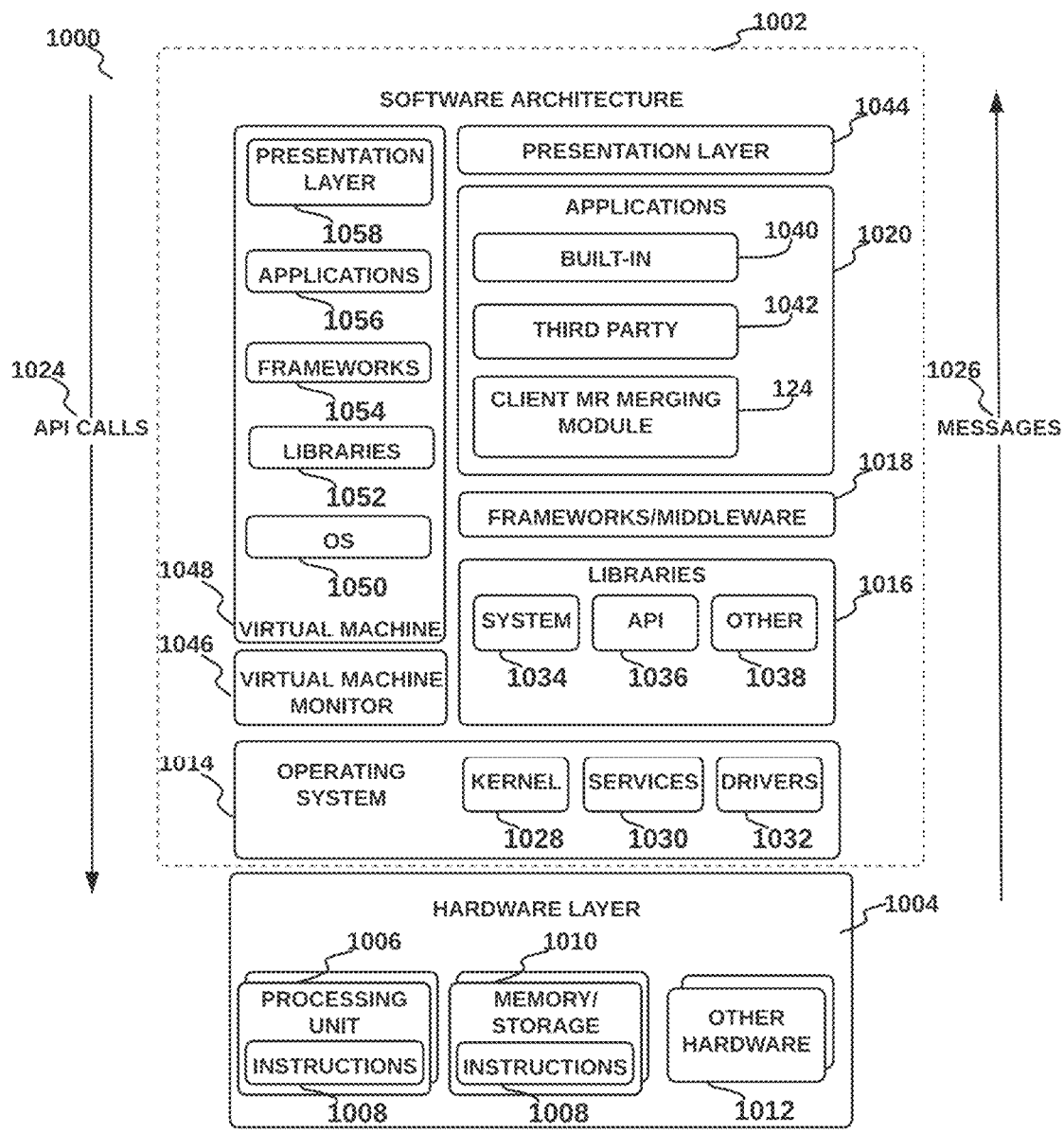
FIG. 10 is a block diagram illustrating an example software architecture, which may be used in conjunction with various hardware architectures described herein.

FIG. 10 is a block diagram 1000 illustrating an example software architecture 1002, which may be used in conjunction with various hardware architectures herein described to provide a gaming engine 104 and/or components of the MR Merging system 100. FIG. 10 is a non-limiting example of a software architecture and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 having associated executable instructions 1008. The executable instructions 1008 represent the executable instructions of the software architecture 1002, including implementation of the methods, modules and so forth described herein. The hardware layer 1004 also includes memory/storage 1010, which also includes the executable instructions 1008. The hardware layer 1004 may also comprise other hardware 1012.

In the example architecture of FIG. 10, the software architecture 1002 may be conceptualized as a stack of layers where each layer provides particular functionality. For example, the software architecture 1002 may include layers such as an operating system 1014, libraries 1016, frameworks or middleware 1018, applications 1020 and a presentation layer 1044. Operationally, the applications 1020 and/or other components within the layers may invoke application programming interface (API) calls 1024 through the software stack and receive a response as messages 1026. The layers illustrated are representative in nature and not all software architectures have all layers. For example, some mobile or special purpose operating systems may not provide the frameworks/middleware 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be used by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) provide a higher-level common infrastructure that may be used by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1042 may invoke the API calls 1024 provided by the mobile operating system such as operating system 1014 to facilitate functionality described herein.

The applications 1020 may use built-in operating system functions (e.g., kernel 1028, services 1030 and/or drivers 1032), libraries 1016, or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures use virtual machines. In the example of FIG. 10, this is illustrated by a virtual machine 1048. The virtual machine 1048 creates a software environment where applications/modules can execute as if they were executing on a hardware machine (such as the machine 1100 of FIG. 11, for example). The virtual machine 1048 is hosted by a host operating system (e.g., operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system (OS) 1050, libraries 1052, frameworks 1054, applications 1056, and/or a presentation layer 1058. These layers of software architecture executing within the virtual machine 1048 can be the same as corresponding layers previously described or may be different.

Figure 11:
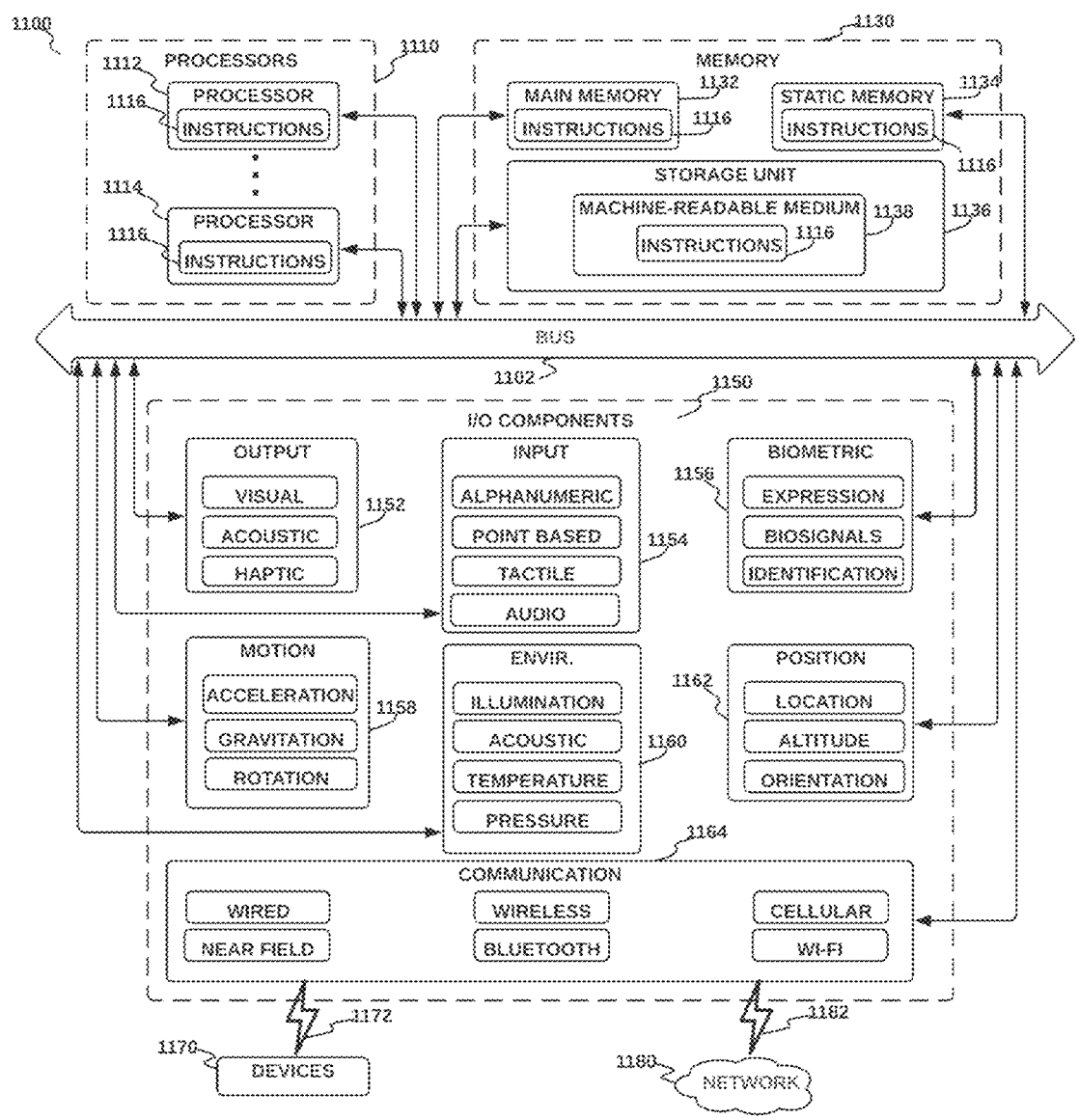
FIG. 11 is a block diagram illustrating components of a machine, according to some example embodiments, configured to read instructions from a machine-readable medium (e.g., a machine-readable storage medium) and perform any one or more of the methodologies discussed herein.

FIG. 11 is a block diagram illustrating components of a machine 1100, according to some example embodiments, configured to read instructions from a machine-readable medium (e.g., a machine-readable storage medium) and perform any one or more of the methodologies discussed herein. In some embodiments, the machine 1100 is similar to the MR merging device 104. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. As such, the instructions 1116 may be used to implement modules or components described herein. The instructions transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines that individually or jointly execute the instructions 1116 to perform any one or more of the methodologies discussed herein.

The machine 1100 may include processors 1110, memory 1130, and input/output (I/O) components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that may execute the instructions 1116. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory/storage 1130 may include a memory, such as a main memory 1132, a static memory 1134, or other memory, and a storage unit 1136, both accessible to the processors 1110 such as via the bus 1102. The storage unit 1136 and memory 1132, 1134 store the instructions 1116 embodying any one or more of the methodologies or functions described herein. The instructions 1116 may also reside, completely or partially, within the memory 1132, 1134, within the storage unit 1136, within at least one of the processors 1110 (e.g., within the processor's cache memory), or any suitable combination thereof, during execution thereof by the machine 1100. Accordingly, the memory 1132, 1134, the storage unit 1136, and the memory of processors 1110 are examples of machine-readable media 1138.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1150 may include a wide variety of components to receive input, provide output, produce output, transmit information, exchange information, capture measurements, and so on. The specific input/output (I/O) components 1150 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1150 may include many other components that are not shown in FIG. 11. The input/output (I/O) components 1150 are grouped according to functionality merely for simplifying the following discussion and the grouping is in no way limiting. In various example embodiments, the input/output (I/O) components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, other or alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1150 may include communication components 1164 operable to couple the machine 1100 to a network 1180 or devices 1170 via a coupling 1182 and a coupling 1172 respectively. For example, the communication components 1164 may include a network interface component or other suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (OR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1162, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance.

Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

I claim:

1. A non-transitory computer-readable storage medium storing a set of instructions that, when executed by one or more computer processors, causes the one or more computer processors to perform operations, the operations comprising:

receiving data describing an environment surrounding a first mixed reality (MR) merging device;

connecting the first MR merging device with a second MR merging device;

receiving inbound content data from the second MR merging device and sending outbound content data to the second MR merging device, wherein the inbound content data includes data describing an environment surrounding the second MR merging device;

processing the received inbound content data;

generating and displaying a merge volume within the environment surrounding the first MR merging device; and displaying the processed inbound content data such that the environment surrounding the second MR merging device appears visually merged with a first portion of the environment surrounding the first MR merging device.

2. The non-transitory computer-readable storage medium of claim 1, wherein communication between the first MR merging device and second MR merging device is a one way communication comprising downloading volumetric 3D data from the second MR merging device and uploading minimal data to the second MR merging device.

3. The non-transitory computer-readable storage medium of claim 1, the operations further comprising:

analyzing the processed inbound content data and the data describing the environment surrounding the first MR merging device to determine a boundary of a merge volume such that it is visually consistent with both the environment surrounding the first MR merging device and the environment surrounding the second MR merging device; and displaying the inbound content data within the merge volume such that the merge volume provides a shared space for interaction between a user of the first MR merging device and a user of the second MR merging device.

4. The non-transitory computer-readable storage medium of claim 1, the operations further comprising determining a size of the merge volume that works for both the environment surrounding the first MR merging device and the environment surrounding the second MR merging device.

5. The non-transitory computer-readable storage medium of claim 1, the operations further comprising overlapping the merge volume with an additional merge volume associated with the second MR merging device.

6. The non-transitory computer-readable storage medium of claim 5, the operations further comprising facilitating interaction between a user of the first MR merging device and a user of the second MR merging device within the overlapping of the merge volume with the additional merge volume.

7. A system comprising:

one or more computer processors;

one or more computer memories;

a set of instructions stored in the one or more computer memories, the set of instructions configuring the one or more computer processors to perform operations, the operations comprising:

receiving data describing an environment surrounding a first mixed reality (MR) merging device;

connecting a first MR merging device with a second MR merging device;

receiving inbound content data from the second MR merging device and sending outbound content data to the second MR merging device, wherein the inbound content data includes data describing an environment surrounding the second MR merging device;

processing the received inbound content data;

generating and displaying a merge volume within the environment surrounding the first MR merging device; and displaying the processed inbound content data such that the environment surrounding the second MR merging device appears visually merged with a first portion of the environment surrounding the first MR merging device.

8. The system of claim 7, wherein communication between the first MR merging device and second MR merging device is a one-way communication comprising downloading volumetric 3D data from the second MR merging device and uploading minimal data to the second MR merging device.

9. The system of claim 7, the operations further comprising:

analyzing the processed inbound content data and the data describing the environment to determine a boundary of a merge volume such that it is visually consistent with both the environment and an additional environment; and displaying the inbound content data within the merge volume such that the merge volume provides a shared space for interaction between a user of the first MR merging device and a user of the second MR merging device.

10. The system of claim 7, the operations further comprising determining a size of the merge volume that works for both the environment surrounding the first MR merging device and the environment surrounding the second MR merging device.

11. The system of claim 7, the operations further comprising overlapping the merge volume with an additional merge volume associated with the second MR merging device.

12. The system of claim 11, the operations further comprising facilitating interaction between a user of the first MR merging device and a user of the second MR merging device within the overlapping of the merge volume with the additional merge volume.

13. A method comprising:

receiving data describing an environment surrounding a first mixed reality (MR) merging device;

connecting a first MR merging device with a second MR merging device;

receiving inbound content data from the second MR merging device and sending outbound content data to the second MR merging device, wherein the inbound content data includes data describing an environment surrounding the second MR merging device;

processing the received inbound content data;

generating and displaying a merge volume within the environment surrounding the first MR merging device; and displaying the processed inbound content data such that the environment surrounding the second MR merging device appears visually merged with a first portion of the environment surrounding the first MR merging device.

14. The method of claim 13, wherein communication between the first MR merging device and second MR merging device is a one-way communication comprising downloading volumetric 3D data from the second MR merging device and uploading minimal data to the second MR merging device.

15. The method of claim 13, further comprising:

analyzing the processed inbound content data and the data describing the environment to determine a boundary of a merge volume such that it is visually consistent with both the environment and an additional environment; and displaying the inbound content data within the merge volume such that the merge volume provides a shared space for interaction between a user of the first MR merging device and a user of the second MR merging device.

16. The method of claim 13, further comprising determining a size of the merge volume that works for both the environment surrounding the first MR merging device and the environment surrounding the second MR merging device.

17. The method of claim 16, further comprising overlapping the merge volume with an additional merge volume associated with the second MR merging device.

18. The method of claim 17, further comprising facilitating interaction between a user of the first MR merging device and a user of the second MR merging device within the overlapping of the merge volume with the additional merge volume.

* * * * *